United States Patent [19]

Fisher

[11] Patent Number: 5,208,872
[45] Date of Patent: May 4, 1993

[54] PROGRAMMABLE REMAPPER WITH SINGLE FLOW ARCHITECTURE

[75] Inventor: Timothy E. Fisher, Houston, Tex.

[73] Assignee: The United States of America as represented by the United States National Aeronautics and Space Administration, Washington, D.C.

[21] Appl. No.: 506,136

[22] Filed: Mar. 30, 1990

[51] Int. Cl.$^5$ .................................. G06K 9/36
[52] U.S. Cl. .............................. 382/42; 382/41; 382/54
[58] Field of Search ............... 382/49, 41, 42, 54; 364/723, 728.01

[56] References Cited

U.S. PATENT DOCUMENTS

| | | | |
|---|---|---|---|
| 4,267,573 | 5/1981 | Chaikin et al. | 364/515 |
| 4,384,336 | 5/1983 | Frankle et al. | 382/49 |
| 4,578,812 | 3/1986 | Yui | 382/41 |
| 4,689,823 | 8/1987 | Wojcik et al. | 382/41 |
| 4,747,157 | 5/1988 | Kurakake et al. | 382/41 |
| 4,783,832 | 11/1988 | Kaneko | 382/41 |
| 4,901,360 | 2/1990 | Shu et al. | 382/41 |
| 4,953,114 | 8/1990 | Sato | 382/50 |
| 5,067,019 | 11/1991 | Juday et al. | 358/160 |

OTHER PUBLICATIONS

Taylor, *Advanced Calculus*, Ginn and Company, 1955, pp. 190–191, 270–279, 430–431.

*Primary Examiner*—Leo H. Boudreau
*Assistant Examiner*—Andrew W. Johns
*Attorney, Agent, or Firm*—Hardie R. Barr; Guy M. Miller; Edward K. Fein

[57] ABSTRACT

An apparatus for image processing comprising a camera for receiving an original visual image and transforming the original visual image into an analog image, a first converter for transforming the analog image of the camera to a digital image, a processor having a single flow architecture for receiving the digital image and producing, with a single algorithm, an output image, a second converter for transforming the digital image of the processor to an analog image, and a viewer for receiving the analog image, transforming the analog image into a transformed visual image for observing the transformations applied to the original visual image. The processor comprises one or more subprocessors for the parallel reception of a digital image for producing an output matrix of the transformed visual image. More particularly, the processor comprises a plurality of subprocessors for receiving in parallel and transforming the digital image for producing a matrix of the transformed visual image, and an output interface means for receiving the respective portions of the transformed visual image from the respective subprocessor for producing an output matrix of the transformed visual image.

19 Claims, 20 Drawing Sheets

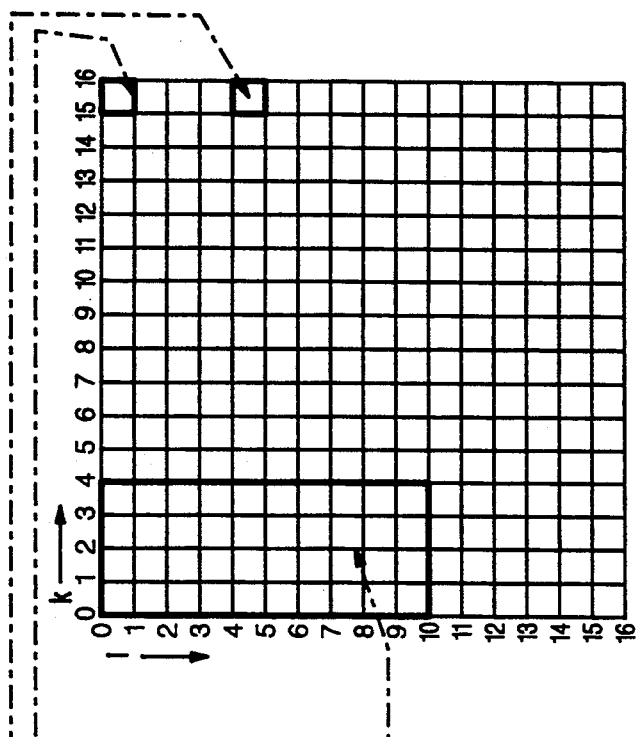
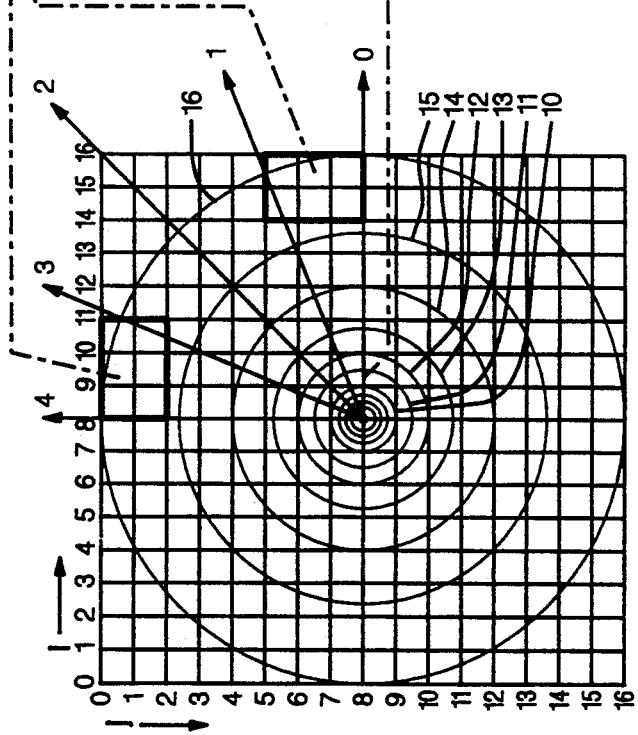
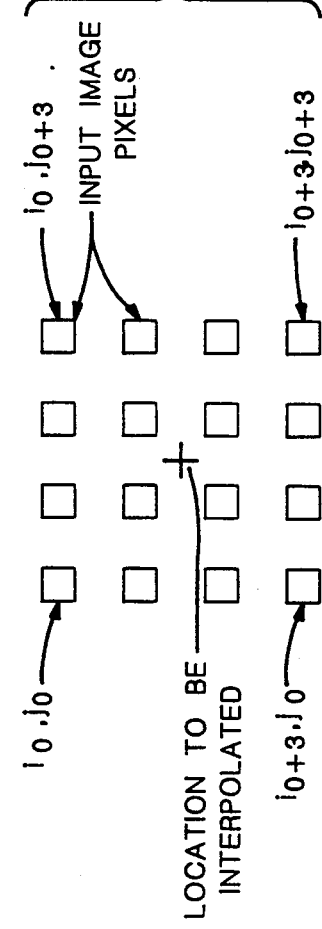

FIG. 7A PRIOR ART
FIG. 7B PRIOR ART
FIG. 7G PRIOR ART
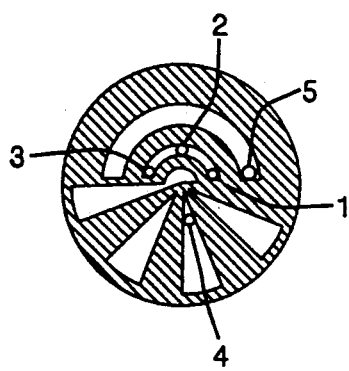
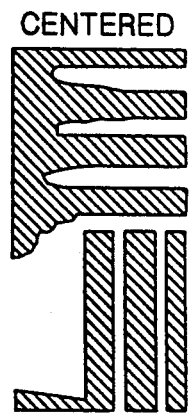
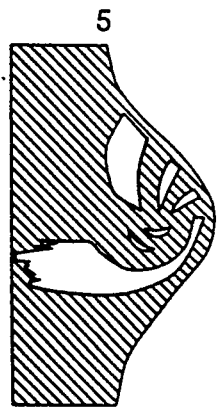
FIG. 7C PRIOR ART
FIG. 7D PRIOR ART
FIG. 7E PRIOR ART
FIG. 7F PRIOR ART
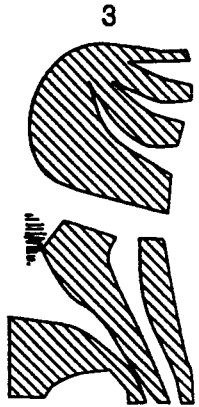
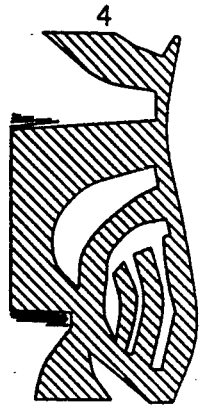

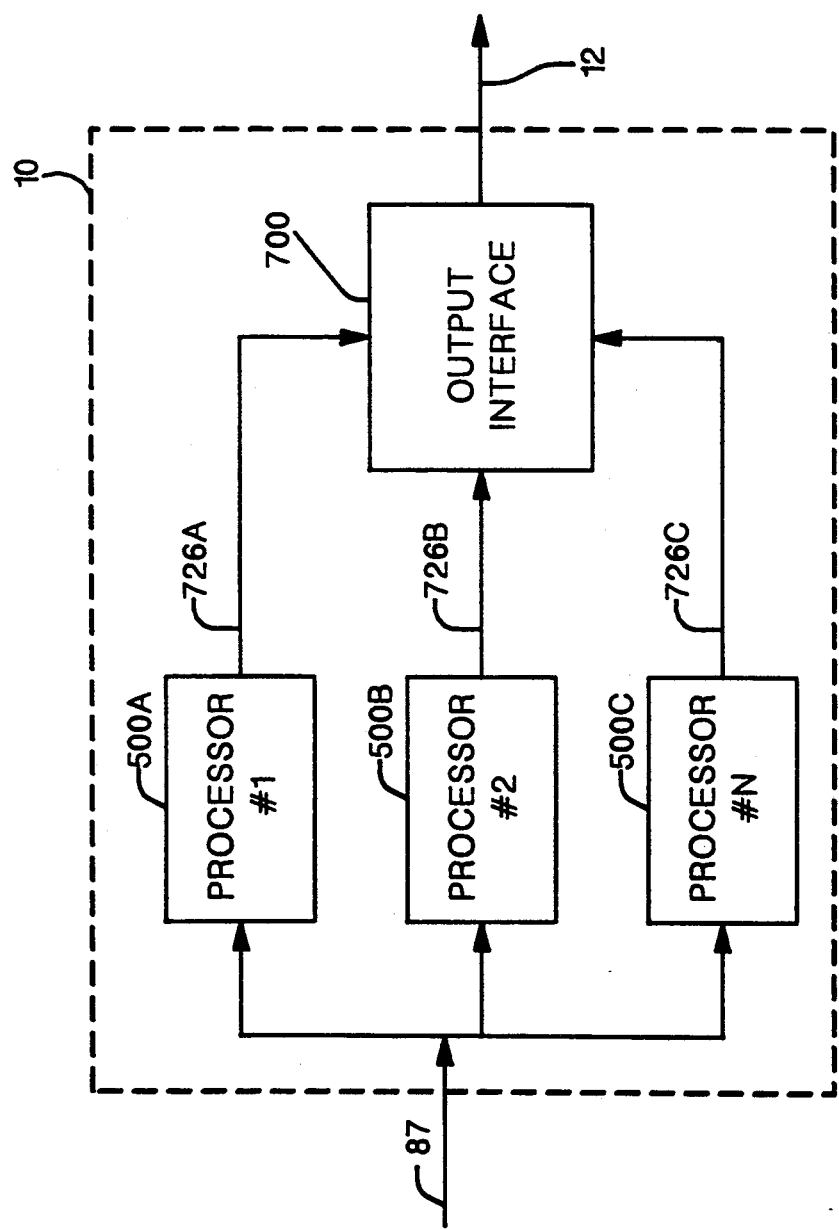

PROGRAMMABLE REMAPPER WITH SINGLE FLOW ARCHITECTURE

ORIGIN OF THE INVENTION

The invention described herein was made by an employee of the United States Government and may be manufactured and used by or for the Government of the United States of America for governmental purposes without payment of any royalties thereon or therefor.

BACKGROUND OF THE INVENTION

1. Field of the Invention

This invention relates in general to image processing systems and methods and in particular to a machine which accepts a real time video image in the form of a matrix of picture elements (hereafter called pixels) and remaps such image according to a selectable one of a plurality of mapping functions to create an output matrix of pixels. Such mapping functions, or transformations may be any one of a number of different transformations depending on the objective of the user of the system. More particularly, the invention relates to a system for the generation of an output pixel matrix according to any one of a number of transformation functions in real time so that the input image may be spatially remapped prior to presenting them to an optical correlator. Still more particularly, the invention relates to mapping functions useful to transform the input video image into an output pixel matrix for display on an image display device as an aid to people with low vision problems such as retinitis pigmentosa and maculopathy. In a particular embodiment, a single flow architecture for video rate image transformations is provided.

2. Description of the Prior Art

Optical correlators are used in pattern recognition, attitude estimation systems and the like to process an input image to create an adjusted image for comparison with a standard image. Such optical correlators (particularly phase-only correlators) are excessively sensitive to scale change and rotation of the input image. Much effort must be expanded in designing and constructing filters that ameliorate such sensitivity.

Mapping or transforming of an input image to produce rotation and scale invariance in an output image while still in the spatial domain substantially eliminates the rotation and scale sensitivity requirements of a correlator of the transformed image. One such mapping or transformation with properties of rotation and scale invariance is disclosed, for example, in U.S. Pat. No. 4,267,573 to Chaikin and Weiman. The Chaikin and Weiman patent describes an image transformation device, which may be a physical device, or a combination of an A/D converter of a video image followed by a mathematical transformation operating on digital signals, which produces transformed output signals (which may, if desired, be viewed as a video image on a television monitor). The output image of the transformed input signal (i.e., the image of the output signals) is "congruent"; that is, the output image is the same size and shape regardless of changes in size of the input image. The output image is also rotationally invariant, that is, its size and shape is the same regardless of rotation of the input image.

The Chaikin and Weiman patent describes mappings from a digitized input Cartesian grid to a digitized output Cartesian grid. The mapping which serves to associate a picture element or cell (herein called a pixel) in the input Cartesian grid through a particular coordinate transformation with the congruent properties described above is $$W = e^z,$$

where Z is the complex number representation $(x + i y)$ of the Cartesian coordinates of the input image pixels, and W is the complex number representation of the coordinates of the transformed output image. Geometrically, this mapping or transformation equation is equivalent to providing a Cartesian output matrix of columns and rows where the output rows represent rays or radii centered in the input Cartesian input matrix and the output columns represent rings and circles centered in the Cartesian input matrix. Each ring radius is determined by $$W = e^x$$

and the angle of each ray or radii is $$\theta = 2\pi y / y_{max}.$$

The Chaikin and Weiman patent also describes curvilinear logarithmic spiral mapping systems which have the property of rotational and scale invariance, but the output coordinate system is not the convenient Cartesian or square grid as in the ray/ring transformation described above. In one, the output grid is a skewed x-y Cartesian grid where the mapping is formed by two orthogonally intersecting families of logarithmic spirals. In another, the output grid is a lattice of equilateral triangles where the mapping is formed by two families of intersecting nonorthogonal log spirals.

The Chaikin and Weiman patent is an important contribution to the art of image transformation in the field of pattern recognition. It is only one image transformation solution, however, of the universe of such solutions, to the general problem of preparing an output image for presentation to a pattern recognition system so that a priori known input image in-plane motions (the so-called "optical flow" in the time-varying image) become purely translational in the output image. It is a great advantage to discover transformations which produce such property in the output image, because pattern recognition systems are simplified where only translation of the output image is required to match a standard or known image.

Before the invention described below, there has existed only one image processor or "remapper" that can operate with sufficient speed and flexibility to permit investigating different transformation patterns in real time. "Real time" is usually considered to be about 30 frames per second with minimum lag. Such an image processor is desirable to investigate an optimal transformation for a given image processing problem. For example, where in-plane rotation and scale invariance are important for one problem, the ray/ring transformation of Chaikin and Weiman described above should be considered. Where Forward Looking Infra Red (FLIR) images are to be transformed or remapped prior to pattern recognition processes, a projective transformation or ratio of affines transformation should be considered. Where an input image should be mapped to an output image such that certain information of the input is displaced and enhanced (e.g., magnified, edge enhanced, etc.) in the output image to benefit people with low vision problems, another transformation should be considered, and so on.

Optical correlators and other pattern recognition methods deal well with translation, but are difficult to design where the output image (i.e., the input image to the correlator) it is working on must be rotated or have its scale changed. The Chaikin and Weiman transformations, such as the ray/ring transformation to a Cartesian output grid, achieve such scale or rotation translation with ease, because translation in one Cartesian direction corresponds to a change in scale while translation in the other Cartesian direction corresponds to a change in rotation. But, if the position of the input image must be changed for pattern recognition, optical correlators cannot easily be designed to cope with such changes. Accordingly, the image processing art has needed a programmable remapping system to easily and rapidly perform spatial transformation as a front end to an optical correlator.

The embodiment of prior art systems would typically include two parallel processors. The first is a collective processor which maps multiple input pixels into a single output pixel. This processor is used where one or more input pixels are compressed into such single output pixel. In other words, the value of each output pixel may be affected by the values of several input pixels. The second is an interpolative processor where a single input pixel affects a plurality of output pixels. The interpolative processor performs an interpolation among pixels in the input image where a given input pixel may affect the value of many output pixels.

DUAL PROCESSING

The prior programmable remapper 10 includes a Collective Processor in parallel with an Interpolative Processor. Each processor remaps the pixel elements of the input matrix into a remapped matrix of pixel elements for storage in an output memory.

As shown in FIG. 2A, the prior art remapper is divided into two distinct processing flows: the Collective Processor and the Interpolative Processor. Each processor includes a plurality of selectable transforms stored in look-up tables. The look-up tables are ordinarily required to be conjugate in the sense that each output pixel is created by operations in only one of the two Processors. Such look-up tables for the Collective Processor and the Interpolative Processor are determined off-line and stored in memory of the remapper so that certain input pixels are remapped into the output matrix by the Collective Processor while the remaining input pixels are remapped into the output matrix by the Interpolative Processor. Such off-line decision as to whether an input pixel is to be processed in the Collective Processor or the Interpolative Processor is often a function of the determinant of the Jacobian J of each particular remapping function stored in remapper 10. Where input coordinates are (x, y) and (u, v) are output coordinates, differential changes in the input coordinate and output coordinates $$\begin{bmatrix} du \\ dv \end{bmatrix} = J \begin{bmatrix} dx \\ dy \end{bmatrix}. \tag{1}$$

The Collective Processor look up tables remaps input pixels into an output pixel in a many to one manner. In other words, several input pixels transform into a single output pixel. Such action takes place at those locations of the input matrix where the Jacobian determinant is less than unity, such as in the periphery for a ray/ring grid remapping function. The Jacobian determinant of a continuous and differentiable two dimensional mapping, associated with the discrete mapping, is defined conventionally as:

$$det\begin{bmatrix} \frac{d(u, v)}{d(x, y)} \end{bmatrix}$$

where u, v are output coordinates and x, y are input coordinates.

The Interpolative Processor look-up tables are computed off-line for storage in memory of remapper to transform those input pixels of that portion of the input matrix where the Jacobian determinant is greater than unity. Accordingly, such look-up tables transform input pixels in a one to many relationship such as in the center of a ray/ring grid remapping function.

COLLECTIVE PROCESSOR

The Collective Processor receives video rate data in serial fashion from an A/D converter. Each pixel of the x, y input image matrix includes an input address i, j representative of its position in the x, y input matrix and a "radiance" value I(i, j) representative of its video characteristic, for example, light intensity. The pixel value I(i, j) is applied to a multiplier.

A sequencer creates an identifier i, j of the position of a pixel value as it is input to the Collective Processor. The function of an Address Look-up table is to identify the output position k, l of the output matrix of u columns and v rows. Since the collective processor maps more than one input pixel into a single output pixel, if the "radiance" of an output pixel is to match, the "radiance" or pixel value of the plurality of input pixels must be weighted to produce a single "average" radiance or pixel value for the output pixel. Accordingly, the factor look-up table, with the address i, j of the present pixel I(i, j), includes a pre-computed and stored weigthing factor w(i, j) which is applied to multiplier. As a result, the output from multiplier is w(i, j)·I(i, j), which is applied to an Adder. The Adder in cooperation with an accumulator memory serves to accumulate the weighted input pixels into a location in the accumulator memory corresponding to the output matrix location of the mapping. In other words, the Collective Processor multiplies each incoming pixel value by a weighting factor and places it in a new output address k, l according to the equation, $$\Theta(k, l) = \Sigma I(i, j) \cdot w(i, j) \tag{2}$$
$$(i, j) \epsilon Q(k, l)$$

where, $\Theta(k, l)$ represents an output image pixel at location (k, l),
w(i, j) represents a (signed) sixteen bit weighting factor as a function of the input image coordinates (i, j),
I(i, j) represents the incoming pixel value (digitized to eight bits), and
(i, j)$\epsilon$Q(k, l) represents that a given output pixel at (k, l) will map to a region (i, j) in the input image determined by the index set Q(k, l).

The weighting factor w(i, j) is preferably a sixteen bit signal, but of course may be of different bit lengths depending upon the precision required. Bit lengths of other signals and table sizes described below may of course vary in length also depending upon the specific design of the remapper according to the invention.

Thus, the input image area is summed in the input image to create the weighted average of the output pixel. The input image regions (i, j) are not allowed to overlap. The Collective Processor operates on each pixel and cannot use the same input pixel in two separate index sets.

The output addresses (k, l) for each output pixel are stored in an address look-up table (ALUT). Such table includes 1,048,576 words each of sixteen bits. Each word corresponds to an output address. The sixteen bit width indicates that output addresses for a 256 by 256 output image are possible. The length of the table allows for an input image of up to 1024 by 1024 pixels in size. When the programmable remapper is to be used with an image smaller than this maximum, the Address Look-Up Table (and the Factor Look-Up Table) may be segmented to allow several transforms to be loaded at once. (Of course, a larger memory may be provided to accommodate a larger input pixel matrix.) Accordingly, many different transforms may reside in the memory of remapper of the preferred embodiment, each one available and selectable by user command.

The weighting factors w(i, j) for each input pixel are stored in a Factor Look-Up Table (FLUT) which is also one megaword (1,048,576) and sixteen bits wide. The weighting factor allows 10 bits of dynamic range for use in normalizing the radiance or light intensity of each pixel. This normalization of each pixel allows as many as 1024 input pixels to be collected into a single output pixel while preserving the average radiance of the input pixels. The remaining six bits of the weighting factor provides a (+or−) shaping factor signal to produce an output pixel free of aliasing. Such bits of the factor look-up table may be arranged in different proportions to compromise the anti-aliasing feature for dynamic range.

INTERPOLATIVE PROCESSOR

The Interpolative Processor is to create output pixels when an input pixel is to be mapped into more than one output pixel. Such a condition exists where a ray/ring mapping grid overlaps a Cartesian matrix of input pixels as shown in FIG. 3. The input pixel (i=8, j=8) maps (for illustration purposes only) into the output matrix for (k=0, l=0 to k=4, l=10) a total of 40 output pixels.

Consequently, the Interpolative Processor is used according to the invention where the coordinates of the mapping grid are more densely packed than the actual pixels of the image sensor, such as at the center of a ray/ring exponential grid. Under such condition, it is necessary to interpolate among existing input pixels to determine the radiance or pixel value of an output pixel. In effect, an output pixel is selected for which its pixel value is to be determined. Then, a number of "interpolation" input pixels are selected which surround the input pixel that maps into the selected output pixel (as well as others). An interpolation of radiance values is then performed for all of such "interpolation" input pixels to determine the radiance to be assigned to the selected output pixel.

The input pixel for which interpolation is required is considered to be at the center of a four by four "patch" of input pixels. Such patch is defined by a leading corner address, $i_o, j_o$, in the input matrix and includes sixteen pixels surrounding the input pixel to be interpolated. Next, each of the sixteen pixels surrounding the input pixel to be interpolated is assigned to weight, i.e., $w(i_o, j_o) \ldots w(i_{o+3}, j_{o+3})$. Then the input pixel value (radiance) of each of the four by four patch of pixels is multiplied by its assigned weight and summed to determine the interpolated weight, which is then assigned to the particular output pixel being processed. Each output pixel, for which interpolation is necessary, is then stored in an output frame buffer.

The interpolative processor can be periodically applied to a buffer memory where all the input image pixel values are stored in an input Cartesian coordinate system. A sequencer steps through the memory in a predetermined manner. Because the entire output image is not created with the interpolative processor, not every output pixel k, l is selected, but rather, the particular output pixels k, l are selected according to the requirements of a particular stored transform. The sequencer applies such output matrix coordinates to the address and the factor memory. For each output pixel location k, l the address and factor memory contains the address of the leading corner input pixel at $i_o, j_o$, of the input pixel matrix, and also includes weight factors $w(i_o, j_o)$ to $w(i_{o+3}, j_{o+3})$ of the four by four array or patch of pixels about the input pixel for which interpolation is necessary.

Such weights, $w(i_o, j_o)$ to $w(i_{o+3}, j_{o+3})$, the leading corner address $i_o, j_o$ and the output pixel matrix address k, l are passed to a data selector. An address generator, with the corner address $i_o, j_o$ received from the data selector generates each address location of the four by four interpolation matrix and in serial fashion applies them to the input pixel frame store buffer memory. Each pixel value I(i, j) is multiplied by it, assigned weight w(i, j), and applied to the multiplier from the data selector.

Next, each of the products of the multiplier are applied serially to the Adder where each weighted input pixel of the four by four interpolation is summed with the sum Θ(k, l) being stored at address k, l of the output matrix frame memory.

The interpolative processor starts with a predetermined leading corner of the input pixel patch where the given output pixel reverse maps into the input pixel matrix. The leading corner defines the patch of pixels about the input pixel to be interpolated. The weights for each such pixel are stored in memory in look-up tables and the processor performs the equation:

$$\Theta(k, l) = \sum_{n=0}^{3} \sum_{m=0}^{3} W(n, m; k, l) \cdot I(i_o(k, l) + n), j_o(k, l) + m)) \quad (3)$$

The Collective and Interpolative processors are designed so that each output pixel originates from one process, or the other process, but not both. Accordingly, the output memory is filled with pixel values from one or the other process.

PREFERRED HARDWARE EMBODIMENT OF THE DUAL FLOW PROGRAMMABLE REMAPPER

The collective processor 20 and interpolative processor 22 of FIG. 2A are shown in FIGS. 2B and 2C. The numbers in these drawings do not necessarily correspond to the numbers in succeeding drawings, and are particular only to FIGS. 2A, 2B and 2C.

Describing the collective processor first, the pixel value of each pixel is applied to the multiplier and multiplied by an 8-bit scale factor stored in a register. Such scale value is stored in the register via a controlling microcomputer. The result of the multiplier is an 11-bit word representing the scaled pixel value.

A switch can periodically switch between contacts to separate collective processing into even and odd portions. Such separation allows the collective processor to operate at one half of the speed that would be necessary to process all of the pixels in a single serial flow. By such separation, the clock cycle of the collective processor is reduced from a 10 MHz clock rate to a 5 MHz clock rate.

A description of the odd portion of the collective processor is presented with the understanding that the even portion operates similarly when the switch is placed in the alternate position. The 11-bit pixel value and the switch is multiplied in a multiplier by a 16-bit weighting factor from the factor look-up table (FLUT) (odd). The FLUT is a 512K by 16 bit memory which sequentially outputs weighting factors - one per input pixel - in synchronism with the arrival of input pixel data. The result of multiplication of the scaled pixel value with the weighting factor in the multiplier is a weighted pixel value of 27 bits which is applied to the Adder.

The other input to the adder arrives from an accumulator memory. The accumulator memory stores the partial results of the input frame or matrix as it is being created. Such accumulator memory is effectively cleared between frames. A 32-bit signal from accumulator memory represents any previous results that have been created for the particular output pixel. The address of the output pixel is determined by the contents of Address Look-up Table (ALUT).

The ALUT is a 512K by 16 bit memory which sequentially reads out 16-bit output addresses-one per input pixel. The sum of the 27-bit weighted input pixel value and the 32-bit previous result is stored back into the same location from which the 32-bit signal came. Accordingly, accumulator memory ultimately stores the output pixel value equal to the many-to-one portion of the mapping of the input matrix or frame to the output matrix or frame.

In addition to storing the results of the multiplications and "collective additions" of prior input pixels into one output pixel location, the results are continuously applied to the output or the display memory. When the output frame has been completed, that is, all the input pixels have been processed, the output frame contains the collected or updated information, obviating the need to transfer the contents of accumulator memory to the output memory. At the end of the frame, the accumulator memory is cleared, and a new cycle begins. The data are added together at the output memory, and do not necessarily represent sets of output pixel information which are exclusive of each other. In other words, an output pixel of the output memory may be filled from collectively processed odd and even pixels.

Turning next to the Interpolative Processor, the input pixel value is not immediately scaled, but rather is applied to a frame buffer depending on the instantaneous position of the switch. The switch performs an identical function to that of the prior discussed switch in the Collective Processor. It sequentially applies input pixel signals in an odd and even fashion to frame buffer even and frame buffer odd.

Assuming that a pixel signal value has been applied to the switch, the switch position determines which one of two banks of frame buffer memory will be selected for inputting the incoming pixel values. The bank of frame buffer memory not currently being written into is used to process the frame or matrix of input data that was input during the previous frame time. After the entire frame of image data is stored in the odd frame buffer and the even frame buffer, the positions of the switches change with the result that the frame that has been stored is processed while a new frame is simultaneously being input into the others of the banks of frame buffer memories.

Processing begins by reading an address out of the sub-image address memory. Such memory, of a size of 32K long and 64 bits wide, contains two logical data signals for each output pixel to be created: (1) the source address of the upper left corner of the four by four "patch" of input pixels to be used in the interpolation, and (2) the destination addresses in the output image where the resulting pixel is to be stored. The source address is applied to the address generator which automatically generates the address $i_0, j_0; i_0, j_1; \ldots i_3, j_3$ of the other 16 input pixels in the four by four patch from which the interpolation value is to be determined. These pixel addresses are applied to a frame buffer. The odd interpolative pixel value signals are applied to the multiplier where they are multiplied by the same scale factor by which the collective pixels are multiplied. It is advantageous to multiply the pixel values in the frame buffer in that only 8 bit pixel values are stored in frame buffer rather than 11 bit values after multiplication. The 11 bit scaled pixel values (each one of the four by four patch of interpolation pixels) are applied serially to the multiplier. The interpolation weighting factors, stored in sub-image factor memory, are serially applied to an expansion PROM which outputs the corresponding weighting factor to the multiplier. The PROMs are each of a size of 256 by 16 by 12 bits. The term "256 by 16 by 12 bits" indicates that one of sixteen different 256 location "tables" may be selected, each of which contains 12-bit number signals.

At any one time, 256 memory locations are accessible, each one of which contains a 12-bit factor. The table number is specified by a run-time parameter. The specific factor from the 256 available in the expansion PROM is indexed by sub-image factor memory.

The memory is a Random Access Memory of 32K by 16 by 8-bits, meaning that there are 32K logical locations (one for each output pixel) and for each location there are 16 weighting factors for each four-by-four interpolation patch, and each weighting factor is 8-bits wide to access one of the 256 possible entries in the PROM. One of these sets of 16 8-bit factors is read out of sub-image factor memory 56D and is applied to the PROM for accessing one of the 256 12-bit signals from the PROM. This 12-bit number is the interpolation factor (one of 16 in the four-by-four interpolation patch) applied to multiplier. Thus, a scaled pixel value is multiplied by one of sixteen interpolation weighting factors each of which is sequentially applied to the Adder. The results of even and odd processing are added together in the Adder and applied to the Adder which sums the results of the sixteen multiplications necessary to form the interpolated output pixel.

A register holds the partial results while they are being created by even and odd interpolation processor. When all sixteen input image pixels have been processed and the output pixel is complete, the result is written to a frame average memory and to output memory.

The frame averaging feature is employed to reduce the amount of noise in the image, as well as to perform special effects. The frame averaging is accomplished differently in the Collective Processor and the Interpolative Processor. In the Collective Processor, the averaging is accomplished in the accumulator memories. The memories are not cleared after the output frame is completed, but the results of the next frame are simply added on top of the previous frame's data. The results are normalized or divided by the number of frames added, by adjusting the scale factor.

The frame averaging in the Interpolator Processor is accomplished in a similar way, but it is not as straight forward as in the Collective Processor. The results of each completed output pixel are written both to the display or output memory and to the memory called frame average memory. This frame average memory serves the same function (in the frame average process) as the accumulator memories of the Collective Processor. After the first frame is processed, the frame average memory contains a copy of the interpolation contribution to the output display. During the processing of the next frame, the results of the newly created pixel value is added to the previous frame's pixel value for that location using the register. This new result is applied both to the output memory and the frame average memory (for averaging yet another frame).

OBJECTS OF THE INVENTION

Accordingly, it is an object of the invention to provide a system where any one of a plurality of different transformations may be used to transform an input image to an output image.

It is another object of the invention to provide a remapping system by which one or more transformations may be discovered or used to map or transform an input image for presentation in an output image for use by a pattern recognition system so that a priori known in-plane motions or "optical flow" of input time-varying images become translations in the output image.

Another object of the invention is to provide an image remapping system which provides a real time remapped image according to any one of a number of different remapping transformations, each of which is selectable on a frame-by-frame basis.

Another object of the invention is to provide a system for remapping an input image into an output image for presentation to visually-impaired people.

Another object of the invention is to provide a remapping system for transforming input pixel information into output pixel information whereby many input pixels are mapped into a single output pixel with radiance information of such input pixels appropriately weighted and where one input pixel is mapped into many output pixels with radiance information of pixels surrounding such pixel appropriately interpolated for such output pixels.

Yet another object of the invention is to provide a programmable remapper with a single flow architecture for creating output pixels with different levels of precision.

Another object of the present invention is to provide a programmable remapper with a single flow architecture where the entire output image is created with a single algorithm and processor whereby the problems associated with merging different outputs of different processors is avoided.

Yet another object of the present invention is to provide a system having an efficient single-type-processor design whereby the use of multiple processors does not overload any particular processor or underutilize another.

Yet still another feature of the present invention is to provide a system with a single flow architecture adaptable for variable sized and overlapping pre-images which can be varied on an output pixel by output pixel basis, for not wasting time with a larger than necessary fixed pre-image nor tiling together smaller fixed pre-images to produce a larger pre-image.

It is also an object of the invention to provide an image remapping system whereby multiple processing elements may be added to the system to achieve a linear increase in processing power. There is no fundamental limit to the number of processing elements which may be present in the system.

Another object of the invention is to provide a system where the pre-image of any output pixel is a non-contiguous collection of input pixels with positive and negative weighting factors.

It is another object of the invention to provide an image remapping system which can choose the resampling kernel, or pre-image, for each output pixel to be a function of the eigenvectors and eigenvalues of the Jacobian matrix describing the mapping at that location.

It is yet another object of the invention to provide a system for encrypting and decrypting an image.

Another object of the invention is to provide a system for geometric compression and decompression of images.

It is another object of the invention to provide a system for performing a correlation between an input image and reference image in real time.

It is yet another object of the invention to provide a system for implementing single layer neural networks. This is accomplished by treating each input pixel as an input node and each output pixel as an output node. Each output is calculated as a weighted sum of all input nodes where the weighting factors are stored in the factor look up table memory.

SUMMARY

The objects identified above as well as other advantages and features of the invention are provided by the system of the invention for remapping input images from one coordinate system to another using a set of look-up tables for the data necessary for the transform. The transforms, which are operator selectable, are precomputed and loaded into massive look-up tables. Input pixels, via the look-up tables of any particular transform selected, are mapped into output pixels with the radiance information of the input pixels being appropriately weighted.

Novel remapping transformations are used in the programmable remapper to transform an input image into a warped output image to accommodate for certain defects of visually-impaired people. For the disease of maculopathy, the central vision field of the eye is missing or impaired, and a mapping transformation is defined to provide a hole in the center of the input image with the mapping transformation causing the information in the entire input image to be stretched in the output image about such hole. For the disease of retinitis pigmentosa (tunnel vision) the eye has a loss of peripheral vision. A mapping transformation is defined to compress the periphery of the input field to a smaller radius corresponding to that of the remaining viable retina.

The invention further includes apparatus and a method for panning the input data creating the effect that an input image is moved with respect to a transformation pattern. Output panning is also provided.

The image processing system of the present invention comprises a camera, an analog to digital converter, a programmable remapper, a digital to analog converter, a video interface and a monitor. Preferably, the programmable remapper comprises one or more identical processors and an output interface. The processors comprise an address look-up table, a factor look-up table, a frame buffer, a multiplier, an adder, and an output memory. The data selected by an ALUT is received from the frame buffer and modified in the multiplier by the factor look-up table. The resultant information is engaged in an accumulation feedback cycle prior to entering an output memory. The output memory inputs to an output interface which is in active connection with the digital to analog converter and video interface.

BRIEF DESCRIPTION OF THE DRAWINGS

The objects, advantages and features of the invention will become more apparent by reference to the drawings which are appended hereto and wherein like numerals indicate like parts and wherein illustrative embodiments of the invention are presented of which:

FIGS. 3a and 3b illustrates a many-to-one transformation of input pixels to a single pixel, and a one-to-many transformation of a single input pixel to many output pixels using the ray-ring transform;

FIG. 4 illustrates an interpolation method by which the radiance value of single input location is interpolated among surrounding input pixels for determining the radiance value of a single output pixel in a one-to-many transformation;

FIG. 7 illustrates the use of input panning with a ray-ring transformation so that the transformation may be centered on the input image thereby preserving the scale and rotation invariance features of the transformed output image;

FIG. 8 is a block diagram of the programmable remapper of FIG. 1 showing the multiple channels of processors associated with the single flow architecture;

FIG. 12B includes the additional features 545, 547, 549 and 551 which are not shown in FIG. 12A.

The above general description and the following detailed description are merely illustrative of the generic invention, and additional modes, advantages and particulars of this invention will be readily suggested to those skilled in the art without departing from the spirit and scope of the invention.

DESCRIPTION OF THE INVENTION

Figure 1:
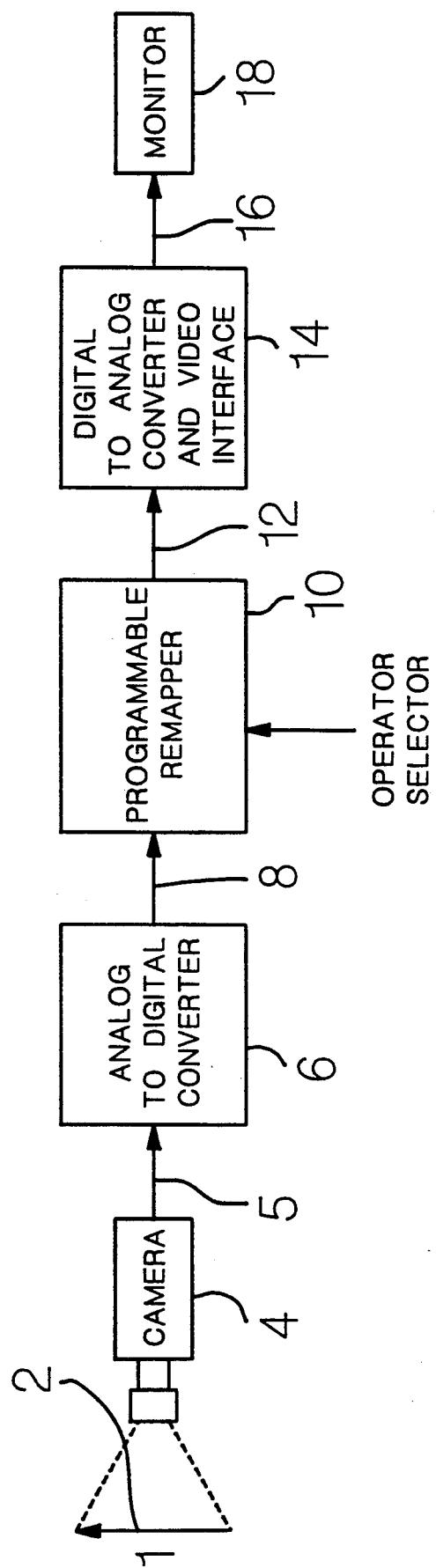
FIG. 1 is a schematic of a video system including a programmable remapper of the present invention whereby input images may be transformed according to an operator selectable transform into an output image.
Figure 2A:
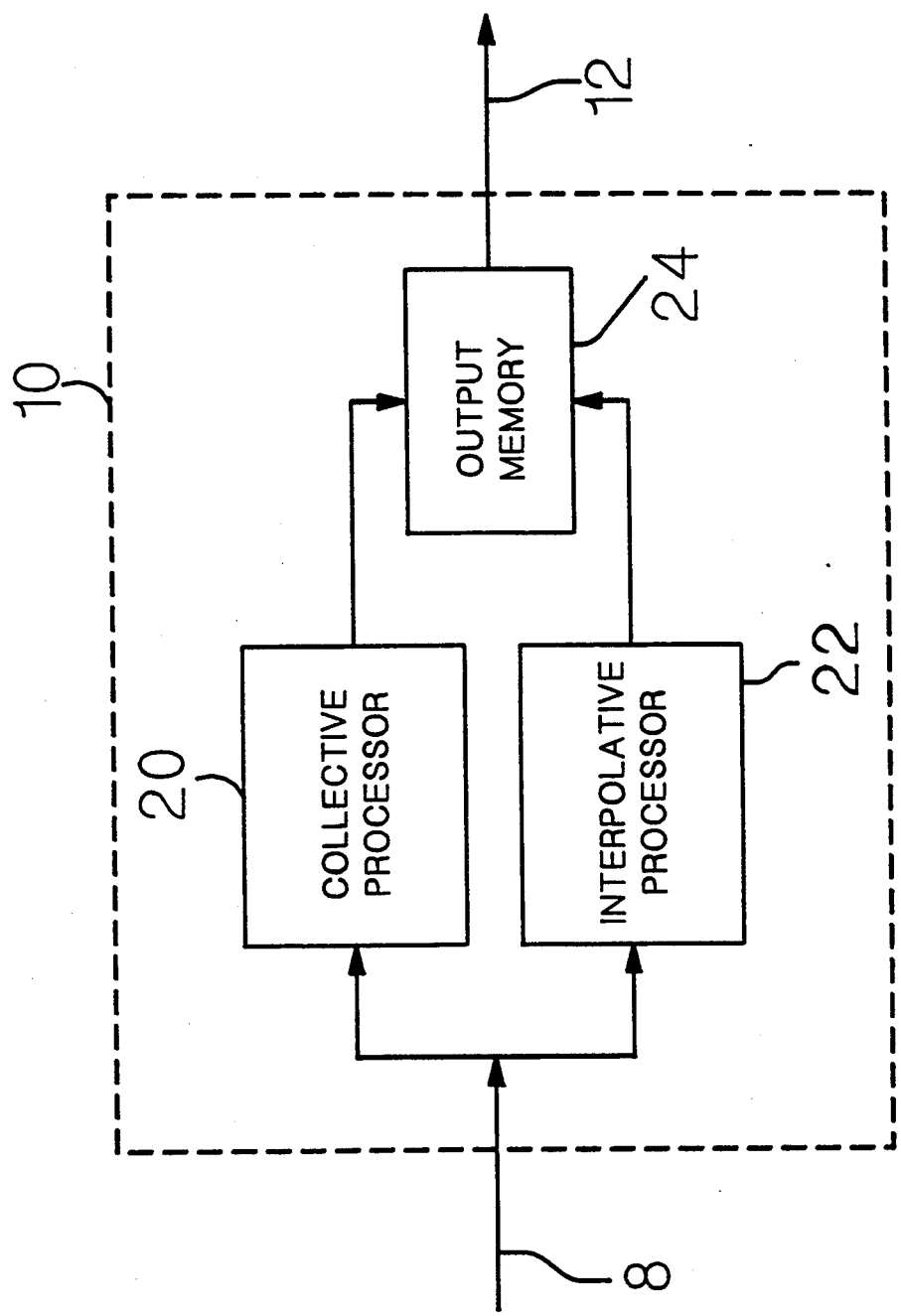
FIGS. 2A, 2B and 2C are block diagrams of a prior art programmable remapper showing the two channels of processor of the programmable remapper.
Figure 2B:
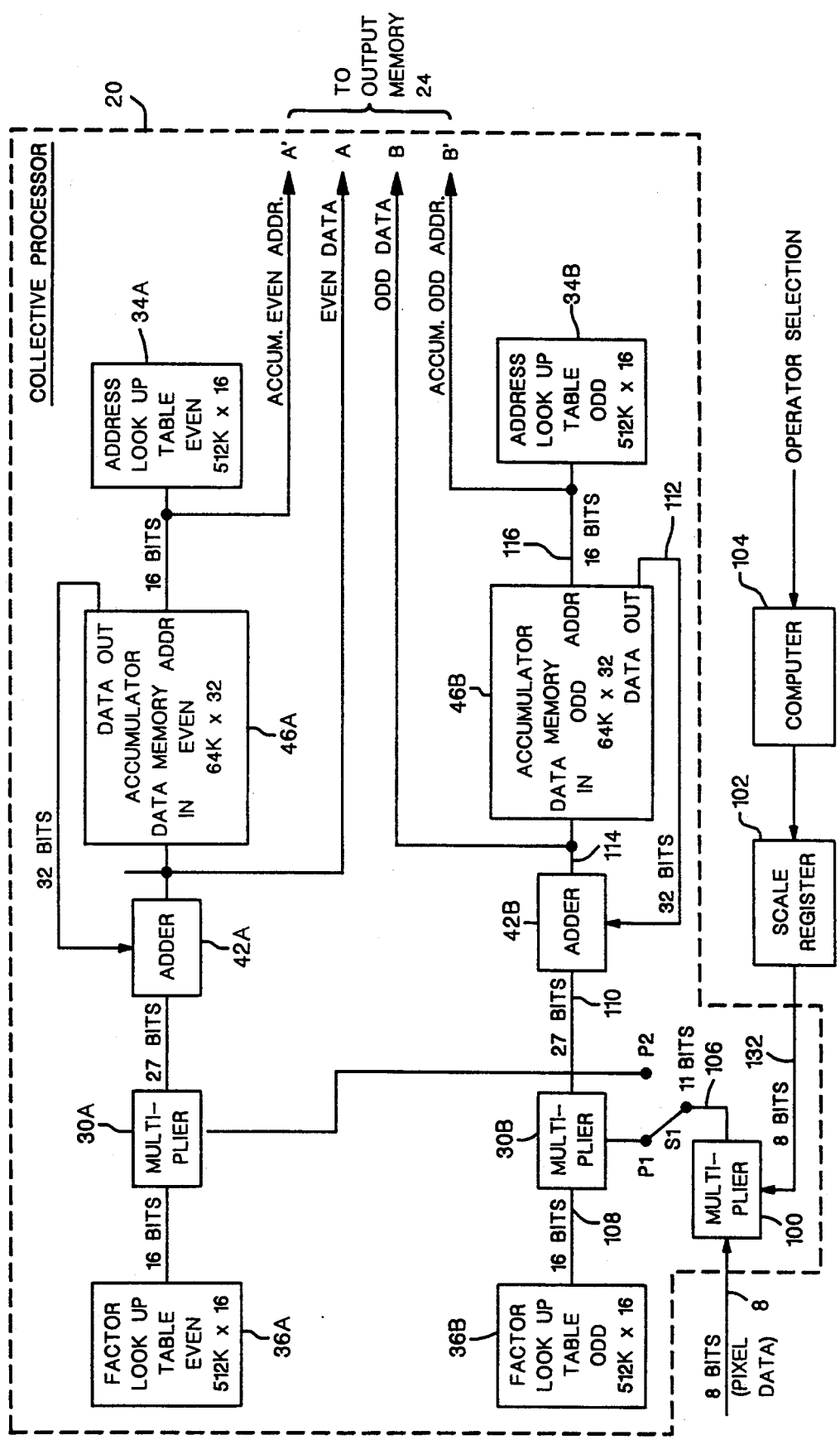
Figure 2C:
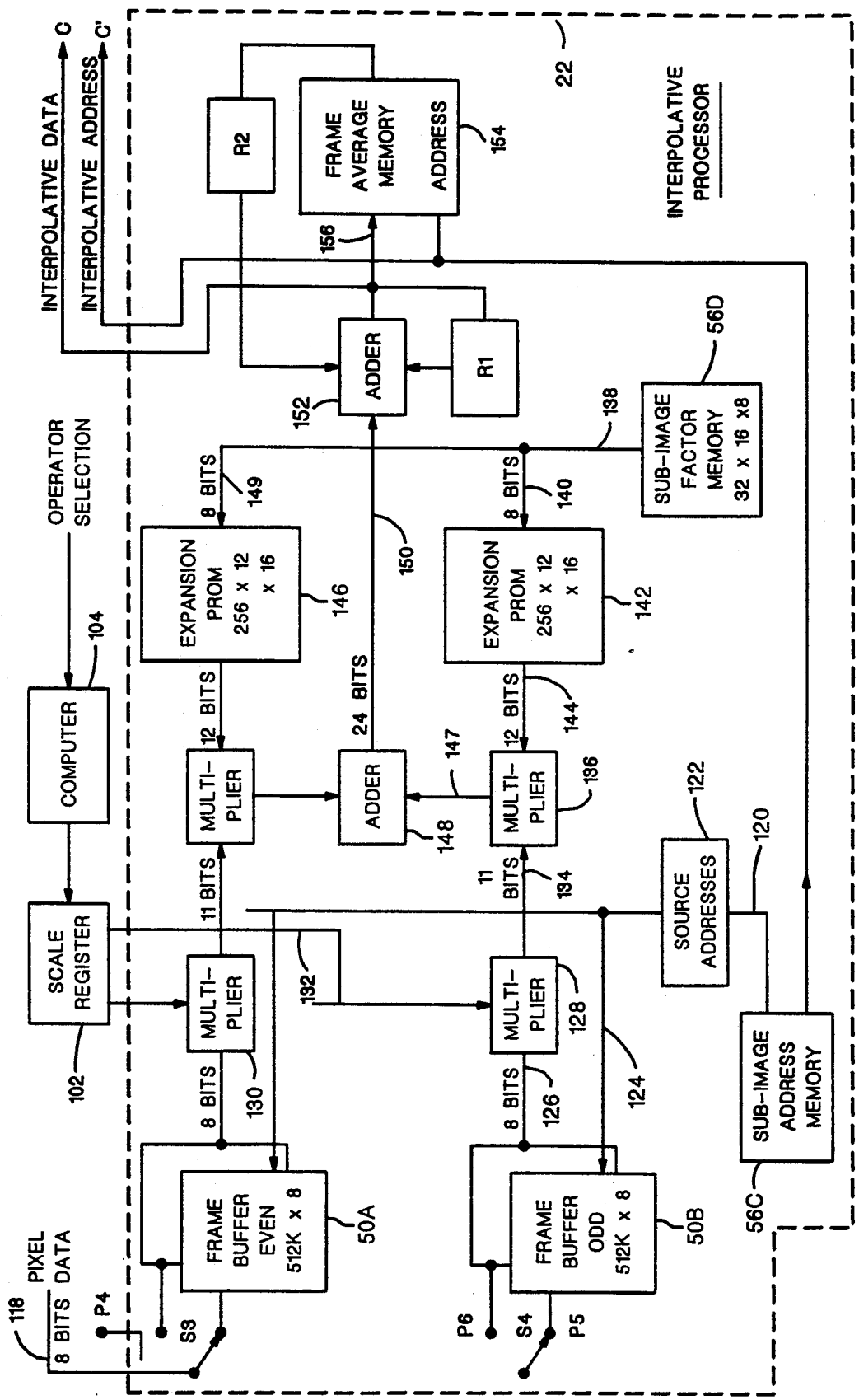

FIG. 1 illustrates the programmable remapper 10 of the invention in the environment of a complete video system including a camera 4 which produces an electronic signal on lead 5 corresponding to image 2. Camera 4 is preferably a conventional video camera, but may be of other technological forms such as an array of charge coupled devices, etc. If the camera 4 produces an analog data stream rather than direct digital values, an analog to digital converter 6, in a well known manner, accepts the electronic video signal on lead 5 to provide a series or matrix of pixel cell coordinates (i.e., location data) and radiance values of image cells or pixels of an x-y Cartesian matrix according to a matrix of I columns and J rows. The address or position in such matrix is designated by its position in such matrix (i,j). The video signal at each address in the matrix has a pixel value or "image state" data such as light intensity value, color, depth, height or other picture cell data.

Such pixel values and associated addresses are applied in real time to programmable remapper 10 where one of a plurality of mapping functions stored therein maps or transforms the input pixels and their pixel values into an output (u,v) Cartesian matrix characterized by K columns and L rows. An output image of the remapped input image may be displayed on a monitor 18 via a lead 16 from a conventional digital to analog converter and video interface circuit 14 which receives the output signal on lead 12.

Digital image processing, whether for video display or other use of the processed image, almost always assumes some continuous nature to the geometrical relationship between input and output images. For much digital image processing, the geometry is taken as being unchanged, an extreme case of continuity. Well known examples are histogram equalization, median filtering, and the like.

Some special effects in television image processing employ non-constant relative geometry, although it is ordinarily of low algebraic order. Two examples are (1) creating picture-in-a-picture and (2) causing a video image to appear as if it were projected onto the face of a rotating cube. In such special effects, there may be discontinuities, but over most of the image the relative geometry is designed so as to appear continuous.

Although digital image processing ineluctably relates grids to grids, the specification below makes reference to the perceived underlying continuous (and often, differentiable) relationship between coordinates in the input and output images. The digital images being processed are then regarded as sample values drawn from an image presumed to exist on a continuous coordinate system. This perspective allows the exploration of image transforms of arbitrary algebraic order and their realization in real-time video.

Mathematics of the Single Flow Architecture

In the preferred architecture, we have eliminated the "dual flow" of the Collective and Interpolative Processors of the prior art remapper and replaced it with a "single flow" architecture (SFA). The functional difference between the two processors lies in the fixed pre-image and the factors we use for the weighting function. For local-radiance-preserving interpolation, the sum of these factors over the pre-image would be unity, while in the collective processor this sum would equivalently be the inverse of the number of pixels in the pre-image. The operation of the SFA can be described by:

$$O(u, v) = \sum\sum_{\{i,j\}} I(x_i, y_j) \cdot w(i, j; u, v) \quad (4)$$

where:
$o(u,v)$ is the output pixel being created,
$\{i,j\}$ is a set of indices that is a function of u,v,
$I(x_i,y_j)$ are the source pixels in the pre-image, and
$w(i,j;u,v)$ are weighting factors.

Implementation of the Single Flow Architecture

It would seem from equation (4) that the Collective Processor should be the basis for the SFA; however, this may not be an optimal implementation of the desired equation. With some modification, either the Collective Processor or the Interpolative Processor could be made to fill all of the output pixels, but an architecture derived from the Interpolative Processor turns out to be more efficient. To see why let's look at what is required to make each processor in the dual flow Remapper perform the function of both processors, or equivalently, implement equation (4).

"Collective" Single Flow Architecture Implementation

Figure 13B:
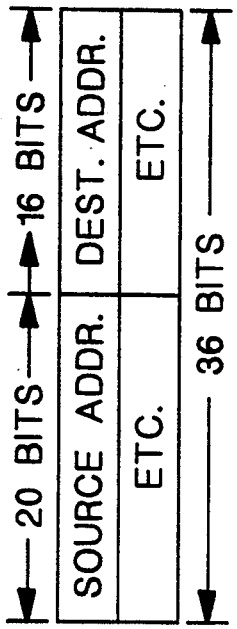
FIG. 13B is an illustration of the 16 bit modified collective ALUT organization of the FIG. 10 alternate embodiment of the present invention.

One problem with the dual flow Collective Processor is that it does not allow overlapping $\{i,j\}$ pre-images. To correct this, we let the Collective Processor operate from a frame store and explicitly specify the pixels in each pre-image. We include in the Address Look Up Table (ALUT) both the destination address in the output image (as before) and the source address of the input image as shown in FIG. 13B. The processing sequence then proceeds as follows:

1. Read the sources address from the ALUT
2. Read the source pixel from the image buffer
3. Read the factor from the FLUT
4. Multiply the factor and the pixel value
5. Read the destination address from the ALUT
6. Read any previous partial sum from the accumulator/display memory
7. Add the previous partial sum to the product of step 4
8. Write the result to the accumulator/display memory Table 1. Processing Algorithm for Collective SFA This process continues until the entire contents of the look up tables have been read. The essential difference lies in what factors we choose for the FLUT and the structure of the ALUT. The modified ALUT requires 36 bits to process each input pixel, while the original Collective ALUT requires only 16 bits.

"Interpolative" Single Flow Architecture Implementation.

Figure 14B:
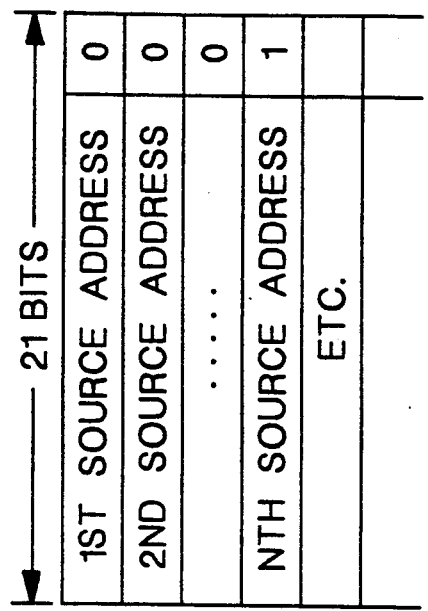
FIG. 14B is an illustration of the 21 bit modified interpolative ALUT organization of the FIG. 9 preferred embodiment of the present invention.
Figure 13A:
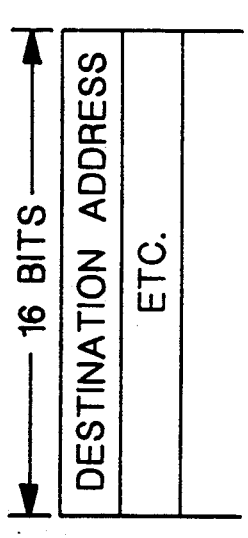
FIG. 13A is an illustration of the prior art's 16 bit collective ALUT organization.
Figure 14A:
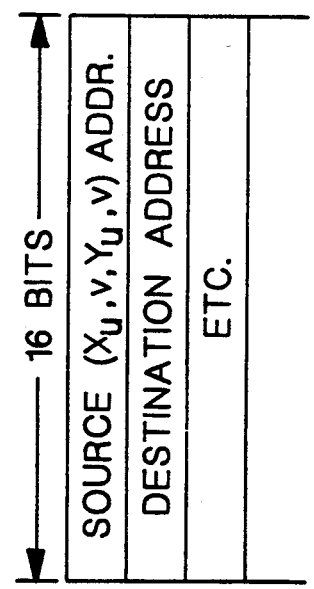
FIG. 14A is an illustration of the prior art's 16 bit interpolative ALUT organization.

In the dual flow Interpolative Processor, only the leading corner $(x_{u,v}, y_{u,v})$ of the 4-by-4 patch of input pixels and the destination address are stored in the ALUT as shown in FIG. 14A. Dedicated circuitry calculates the addresses of the pixels in the pre-image using offsets from this leading corner. Because of the arbitrary shape of the pre-image in the SFA, we must store explicit addresses of every source pixel in the pre-image as shown in FIG. 14B. We also must signal the end of one pre-image and the beginning of the next. The latter is accomplished, for example, by a single "pre-image identifier" bit in each ALUT entry which is set to '1' to signal the last pixel in the pre-image and to '0' otherwise. Since we are creating the entire output image with this processor, we can create the pixels in the order of their output locations, alleviating the need to store the output locations of each pixel. The processing sequencing of this architecture is shown in Table 2. This process continues until the contents of the Look Up Tables have been read.

1. Read the source pixel address from the ALUT
2. Read the source pixel from the frame buffer
3. Read the factor from the FLUT
4. Multiply the factor and the pixel value
5. Accumulate this value with any previous values in the accumulator register
6. If the pre-image identifier bit is a zero go to step 1
7. Else, write the output results to the display memory
8. Increment the output memory address Table 2. Processing Algorithm for Interpolative SFA In the original interpolator, there were three 16-bit entries for every output pixel created. Now we have n 21-bit entries for every input pixel, where n is the number of pixels in the pre-image of that output pixel. The single bit on the right of the entries in FIG. 13B represents the status of the pre-image. A '0' in this location tells the processor to keep accumulating the partial sum, and a '1' indicates that this is the last input pixel that contributes to this output pixel. The '1' initiates flushing the completed sum to the display memory. As a minimum, only a single bit is required; however, this field may be increased to hold additional information about the transform which can be decoded for more efficient processing of the image. An example might be encoding a certain number of output pixels to skip places where the transform never writes. See FIGS. 13A, 13B, 14A and 14B.

Comparison of Collective and Interpolative Implementations

Figure 15:
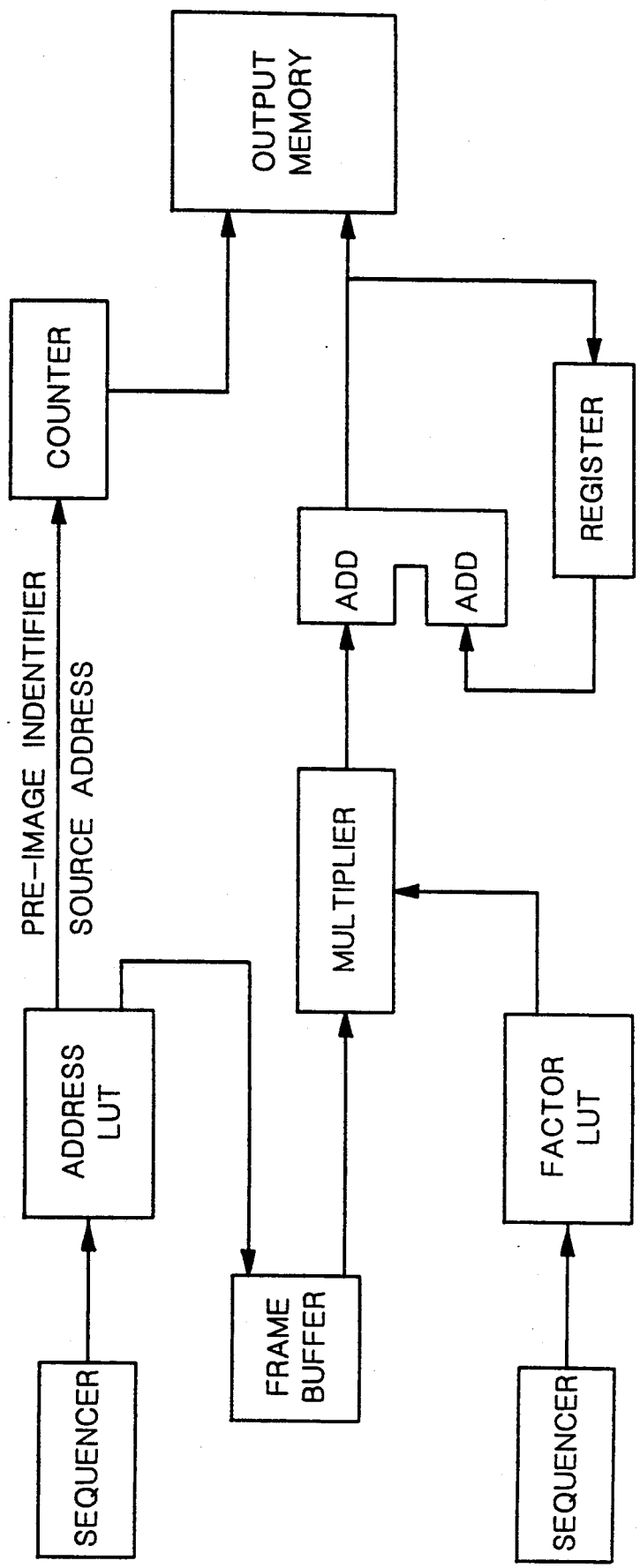
FIG. 15 is a block diagram of the preferred embodiment of the programmable remapper of the present invention illustrating the single flow architecture.

There are two main differences between the "Collective" and the "Interpolative" implementations of the SFA. The first is that the Collective version uses more memory in the ALUT than the Interpolative version does. The second difference is how the two flows combine the partial sums into completed output pixels. The Interpolative processor does this more efficiently by holding the partial sums in a register until the summation is complete and then releasing the result to the display memory. The Collective version, on the other hand, employs a technique called "read-modify-write" (steps 6, 7, and 8 of Table 1). This technique is inherently slower due to the access time of the memory (several times that of the register used in the Interpolative version). This is a major speed limiting bottleneck in the Collective design. It is possible to eliminate this read-modify-write loop by judicious ordering of the look up tables to create the output pixels in order. Thus, we chose the interpolative version implementation of the single flow architecture. It is this architecture we refer to as the Single Flow Architecture, and is shown in FIG. 15.

Advantages of the Single Flow Architecture

The Single Flow Architecture is an extension of the dual flow Programmable Remapper architecture, yet it offers several advantages which make it much more powerful than its predecessor. The most obvious advantage of the SFA is that we no longer have two processors which create output pixels with different levels of precision. Since the entire output image is created with a single algorithm and processor, we can avoid the problems of merging the different outputs of the Interpolative and Collective Processors. The SFA is also a more efficient design because one type of processor is not idle while the other is overloaded. The SFA also allows variable sized and overlapping pre-images. The overlapping of pre-images is a requirement for interpolative processing and is an added benefit for collective processing. The fact that the pre-image is of variable size means that the processor is not wasting time with a larger than necessary fixed pre-image, nor is it wasting time tiling together smaller fixed pre-images to produce a larger one. In the Interpolative Processor, if we wanted to do a 3-by-3 interpolation instead of a 4-by-4, we had to waste seven out of sixteen machine cycles processing zeros for the pixels not included in the interpolation kernel. The SFA also removes the read-modify-write loop that was an inherent bottleneck in the Collective Processor, allowing the SFA to operate at higher clock frequencies.

The most important advantage of the SFA, however, is that the new architecture will allow a level of performance not previously achievable. At video rates, the original Remapper was capable of producing a 256-by-256 output image, only half of which could be filled with the Interpolative Processor. These limitations were the result of speed limitations on the hardware which operated at 10 MHz. This output image size is not satisfactory for many applications in pattern recognition where 512-by-512 images are becoming standard. The important performance gain with the SFA is not so much raw processing speed as its ability to be partitioned for parallel processing. It is possible to have two or more identical SFA processing elements operating in parallel, with the first processing element creating the "top" half of the output image, and the second processing element creating the "bottom" half of the output image. In fact, any number of processing elements may be used, each creating a fraction of the output image. The results of each processor can easily be combined for display.

Unlike the prior Remappers, the amount of processing power required for a particular transform is no longer driven only by the resolution of the input and output images. Instead it is a function of the average number of pixels that constitute the pre-image. For example, if only a few input pixels affect any given output pixel, then the processing power required is less than if each output pixel is affected by several input pixels (as might be the case for extremely accurate interpolation, etc.).

More subtle advantages of the new architecture arise from the increased performance over the previous Remapper. This performance increase is due to the increased end to end processing power afforded by using multiple SFA's in parallel. This increased ability allows us to increase the output image size from 256-by-256 to 512-by-512, and increase the interpolative ability from only 32,700 output pixels to the full output resolution of 262,144 pixels.

Hardware Implementation of Input Image Panning

Figure 12A:
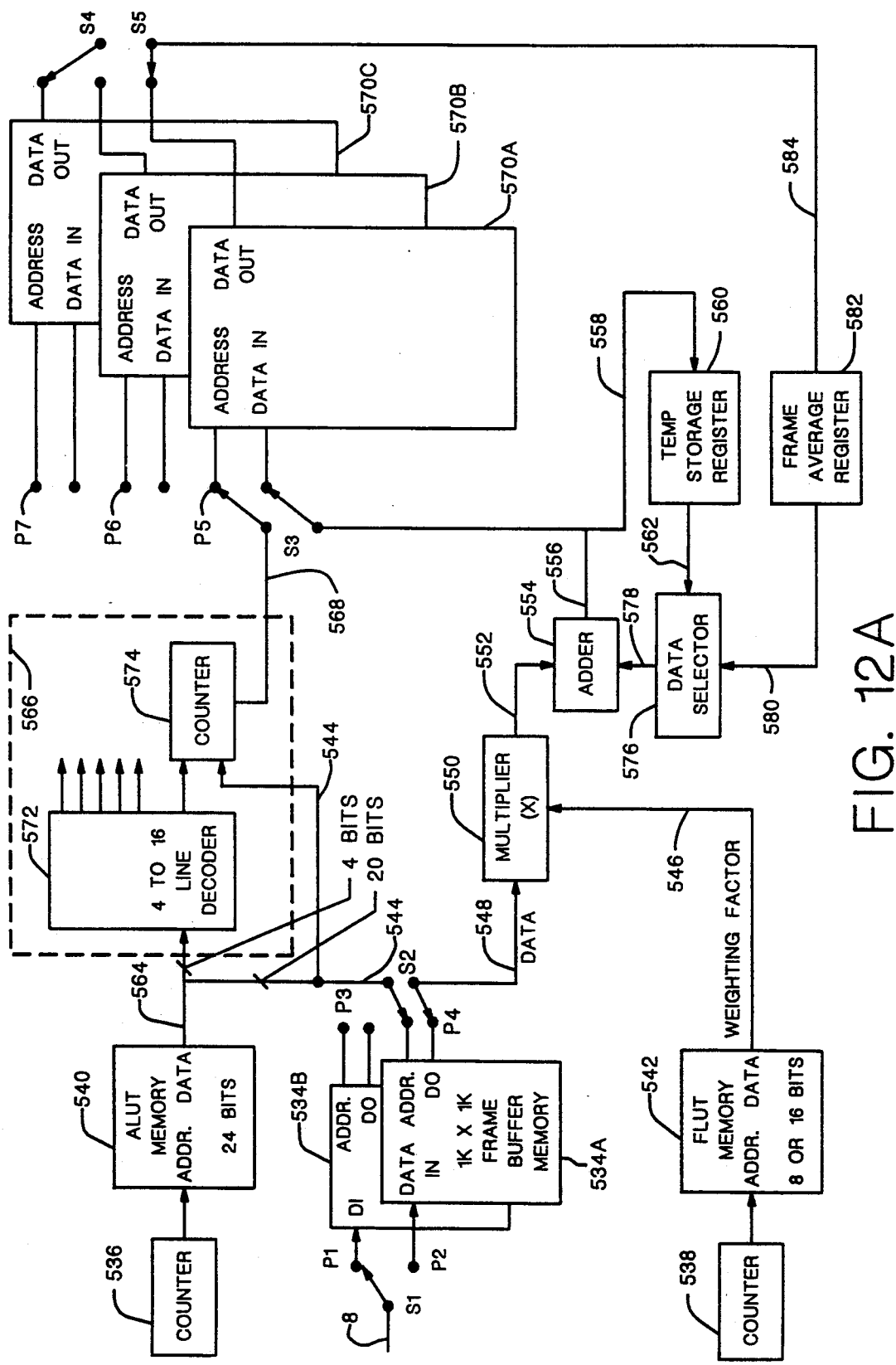
FIGS. 12A and 12B are data flow diagrams of the preferred embodiment of the processor used in the single flow architecture of the present invention as shown in FIG. 9 illustrating more detail.
Figure 12B:
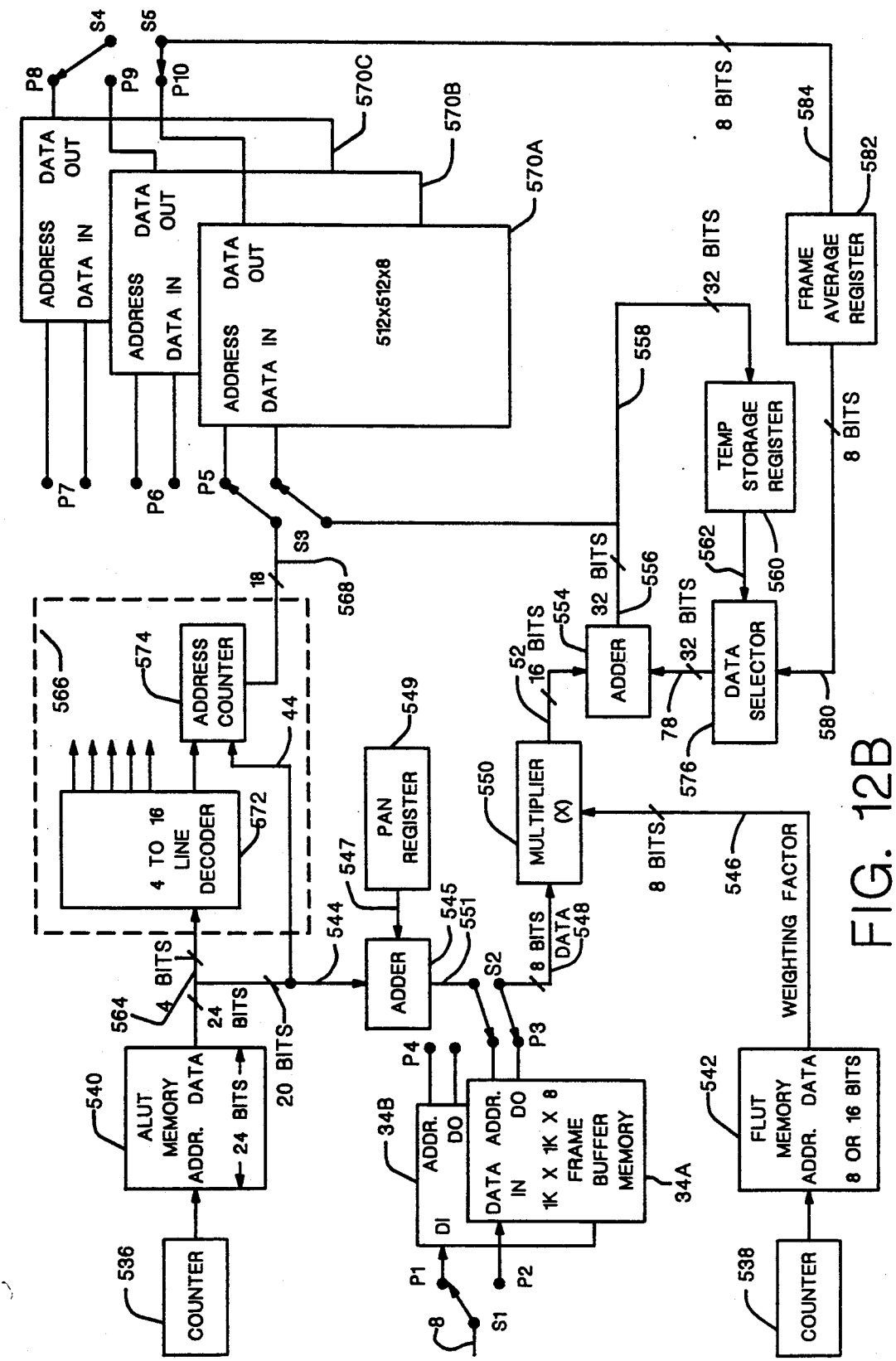

The hardware required for input image panning for the preferred embodiment processor 10 is illustrated in FIGS. 12A and 12B. Input pan is accomplished by setting the appropriate x and y pan values in the pan register 549 of FIG. 12B. This is usually accomplished digitally by a controlling computer, but many come from a joystick or other pointing device which will supply a digital value calibrated in pixels which may be stored in this register. The value in this register can be updated for each input image frame. This pan value from the pan register 549 is supplied on lead 547 for presentation to the adder 554. The input image address data from the ALUT 540 on lead 544 is also applied to the adder 554 which adds the data on lead 544 and 547. The result of the addition is available on lead 551 and becomes the actual address to the frame buffer memories 534A and 534B. In addition to calculating the sum of the data on leads 544 and 547, the adder 554 can also detect if the result of the addition causes the result on lead 551 to overflow the boundaries of the frame buffer memories (tries to access a memory location greater than physically available), or underflow the boundaries of the frame buffer memories (tries to access a negative memory location.) This overflow/underflow information can be used to "blank out" the data from the frame buffer memories to prevent the image from "wrapping", that is, keeping the left portion of the image from appearing on the right side, etc. This can be achieved by setting control signals to the multiplier 550 to tell it to replace the (erroneous) data on lead 548 with zero. This will effectively blank, or ignore this input data.

Hardware Implementation of Output Image Panning

Figure 11:
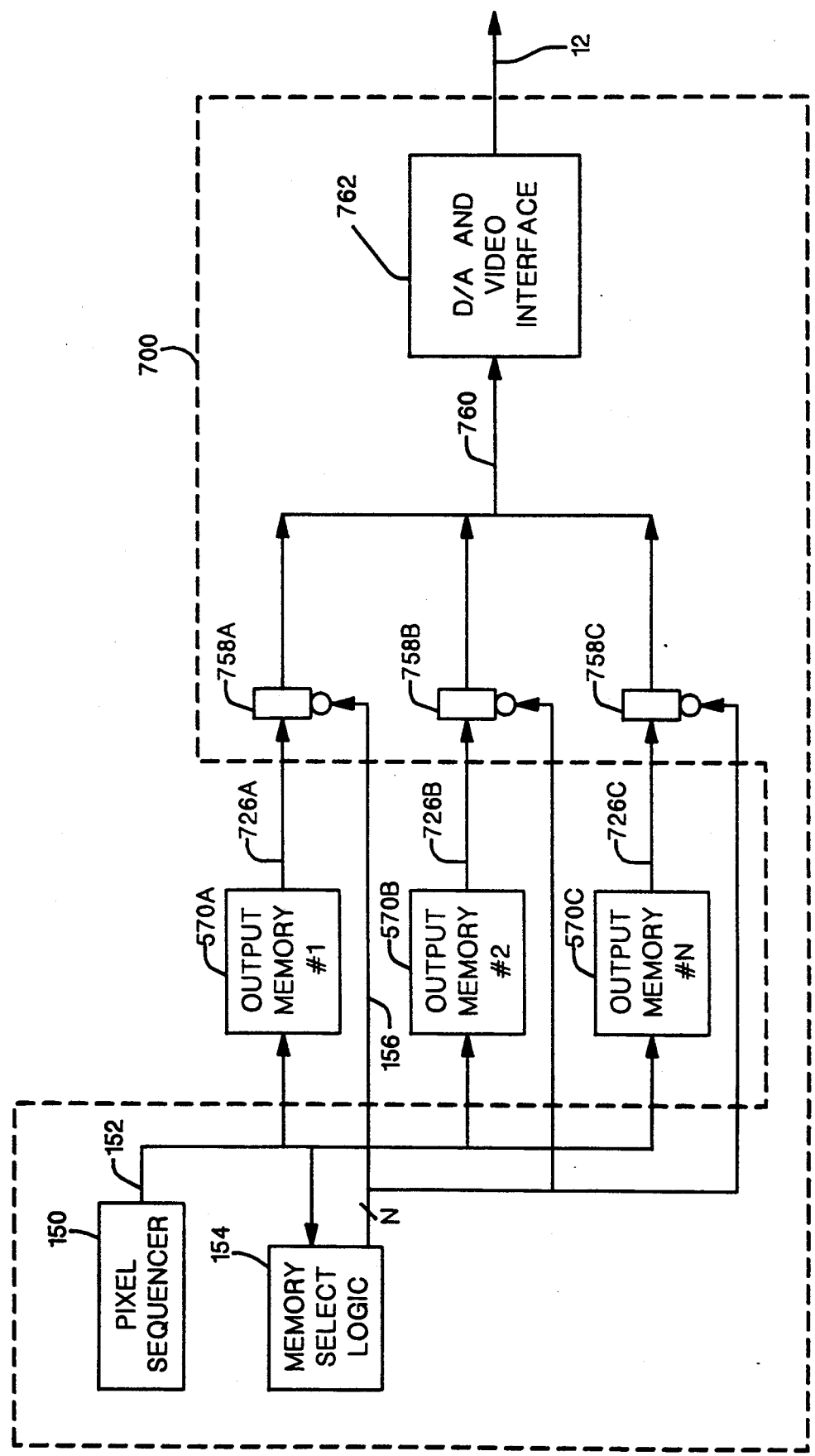
FIG. 11 illustrates the preferred embodiment of the output interface used with the preferred embodiment of the processor of the present invention as illustrated in FIG. 12.
Figure 17:
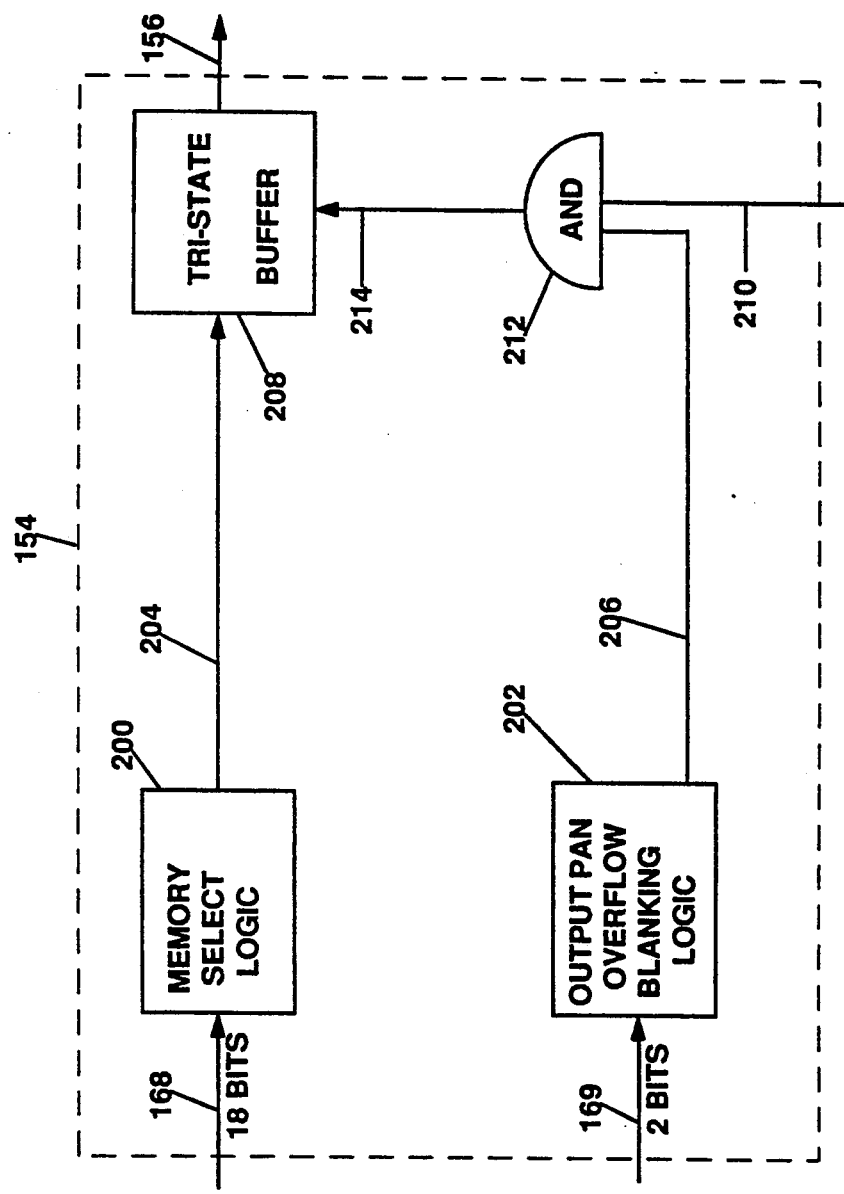
FIG. 17 is a block diagram illustrating the memory select and output pan overflow blanking logic of the present invention.
Figure 19A:
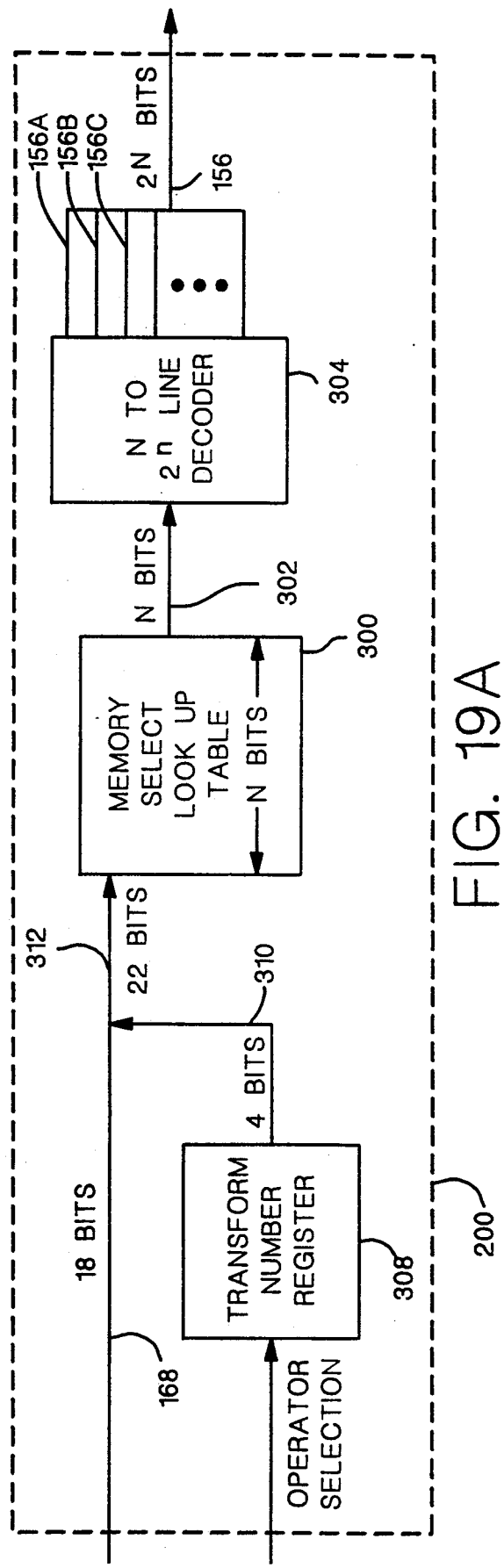
FIG. 19A is a block diagram illustrating a first embodiment of the memory select logic of the present invention.
Figure 18:
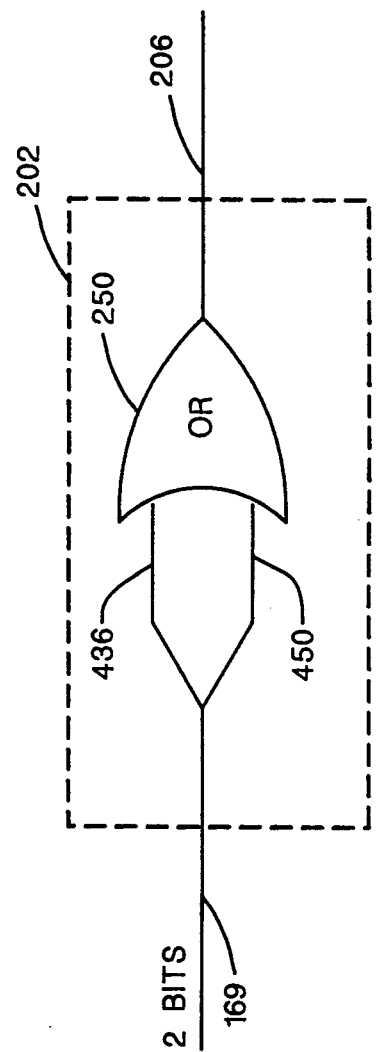
FIG. 18 is a block diagram illustrating an embodiment of the output pan overflow blanking logic of the present invention.
Figure 19B:
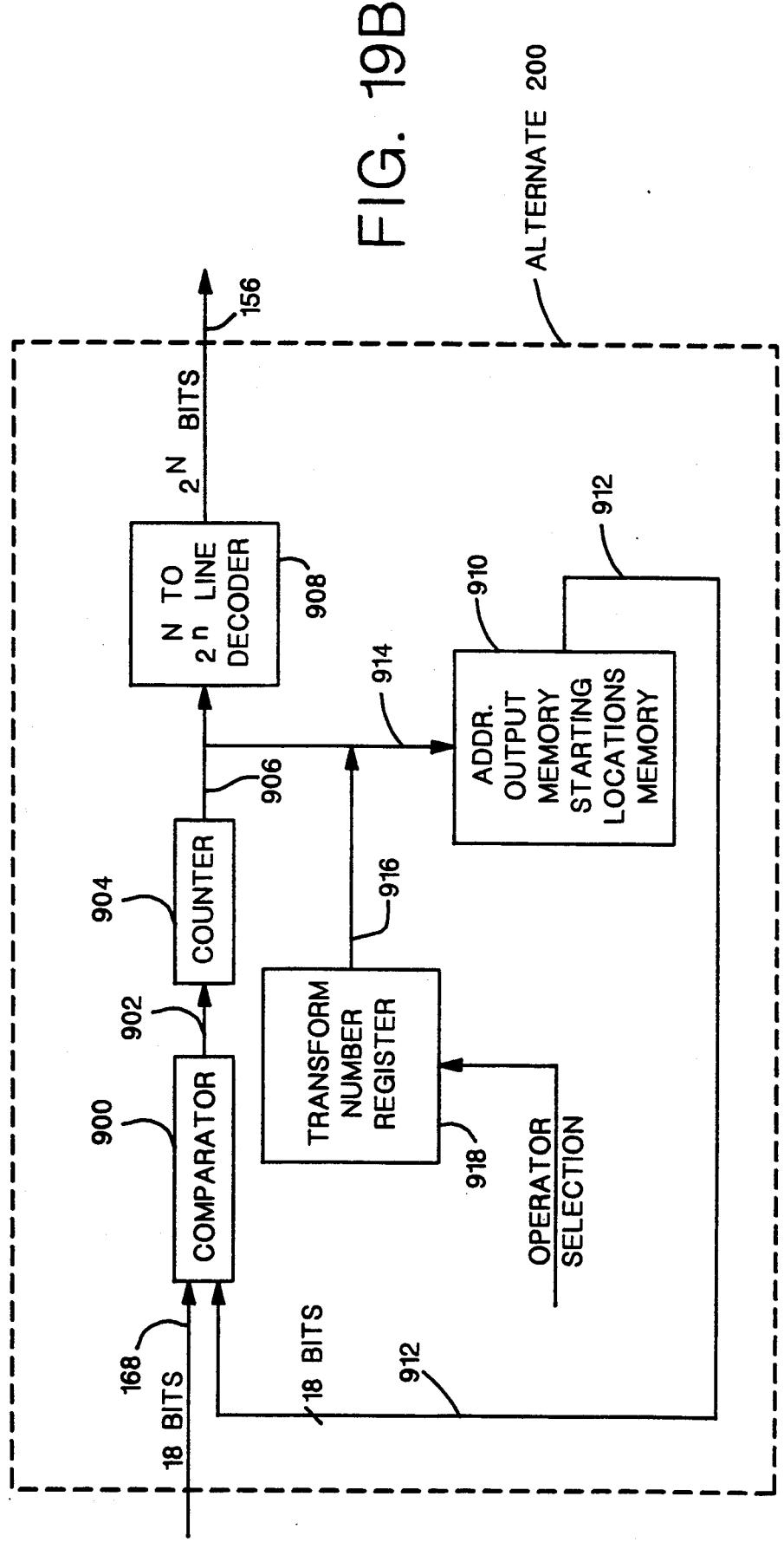
FIG. 19B is a block diagram illustrating a second embodiment of the memory select logic of the present invention which can be used if output panning is not desired.

Output panning is accomplished by the output interface 700 by shifting the addresses to the output memories prior to display as shown in FIG. 11. In normal operation, the pixel sequencer 150 reads each output pixel in turn until all pixels have been read and displayed on the screen via lead 12. When output panning is active, these addresses from the pixel sequencer 150 are modified by an amount specified in the output pan register so as to actually address pixels other than the nominal pixel. Since the shift value is constant for the frame time, the effect is to shift the entire image vertically and horizontally a specific distance. It is possible to allow the image information, which would have been shifted off of the edge of the output image, to be shifted in on the opposite side. The result of this operation is to "scroll" the image. As information is lost off of one edge of the image, it appears on the opposite side. It is also possible to prevent this information from being displayed. This process is called "blanking" the display. The blanking or scrolling of the panned output is controlled by a user configured input on lead 210 as shown in FIG. 17. The logic which controls the output blanking is shown in FIG. 18.

Figure 16:
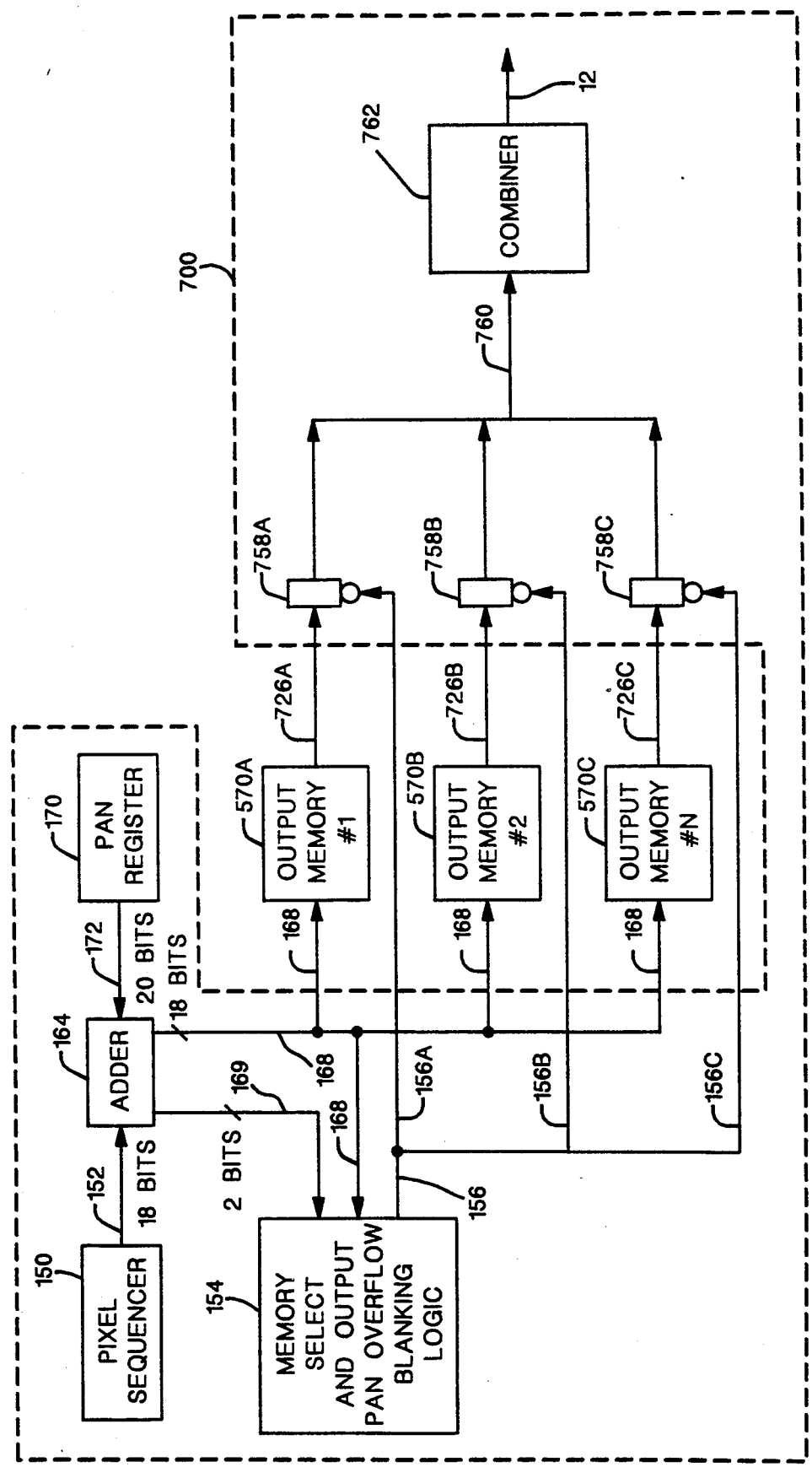
FIG. 16 is a block diagram illustrating the output interface for the preferred embodiment processors of the present invention.
Figure 20:
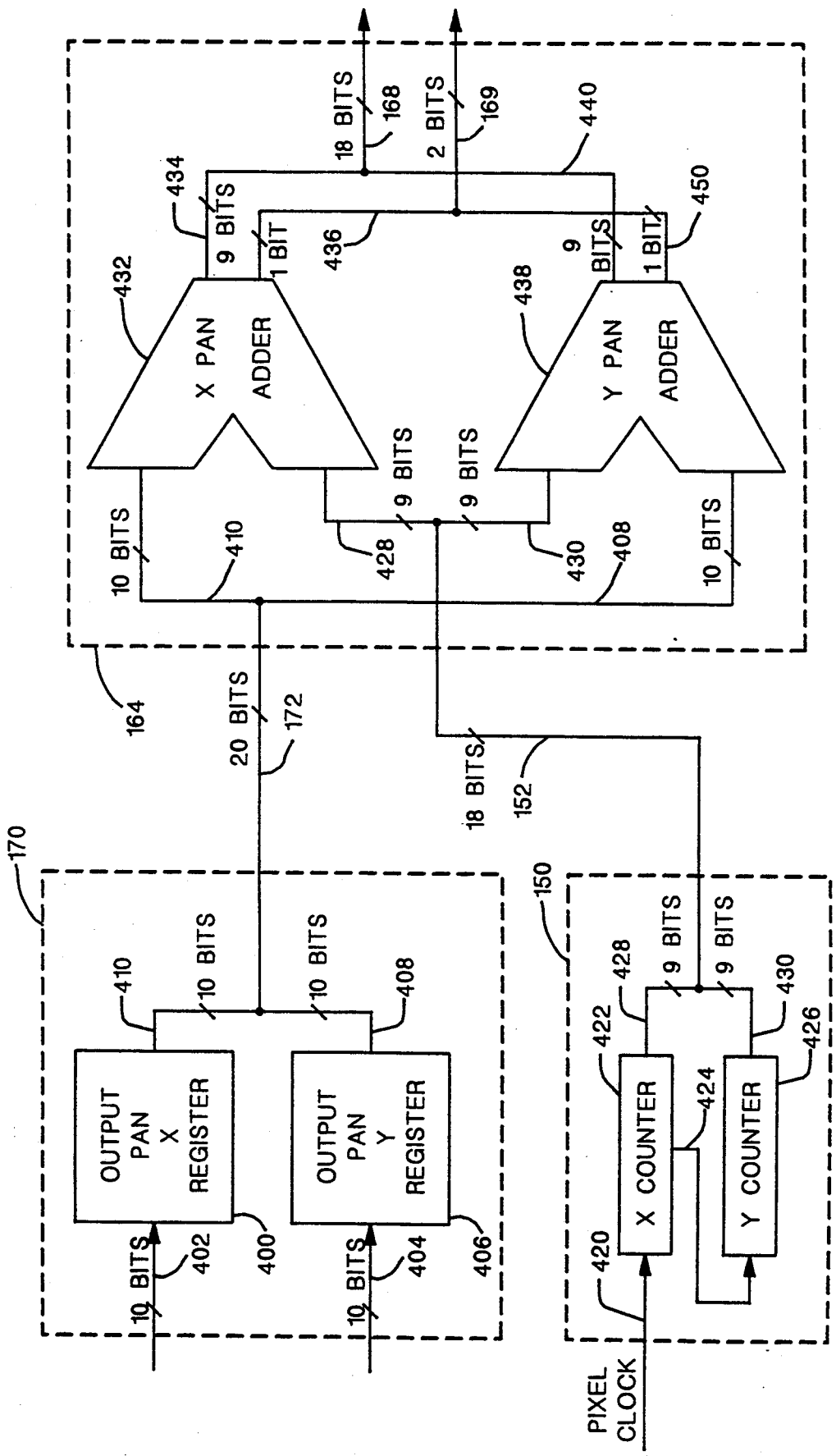
FIG. 20 is a block diagram illustrating an embodiment of the output interface pan implementation of the present invention.

The output pan hardware embodiment is shown in FIG. 20 which is a detailed drawing describing the pixel sequencer 150, the adder 164 and the output pan register 170 of FIG. 16. As seen in FIG. 20, the pixel sequencer 150, the adder 164 and the output pan register 170 are all segmented into separate "x" and "y" components where x refers to the horizontal dimension and y refers to the vertical dimension.

Pixel Sequencer

The pixel sequencer 150 is driven by a master "pixel clock" on lead 420 and increments the x counter 422 to sequence through the pixels in a single row. The current pixel's x address (or matrix column) is then available on lead 428 as a 9-bit unsigned magnitude binary number. When the x counter reaches its maximum value (the end of the row), the counter is reset and the signal on lead 424 is activated to increment the y counter 426 to point to the next line of the image (or row of the matrix). Thus the pixel sequencer 150 reads all of the first line of the output image, then reads all of the second line, and so on until the entire image has been read. The x and y addresses are passed via lead 152 to the adder 164 for implementation of the output panning process.

Output Pan Register

The output pan register 170 is similarly divided into its horizontal (x) and vertical (y) components. The data in this register will determine the amount of shift in the resultant output image. The data placed in the output pan register comes from the user of the system through one or several means including the digitized output of a joystick, trackball, eye position monitor or other device. The x and y components of the pan value are transmitted by leads 402 and 404 respectively to the output pan x register 400 and the output pan y register 406. These registers contain the 10-bit two's complement (positive or negative) values of the pan which allow a#+/−512 pixel pan in both the horizontal (x) and vertical (y) directions. The x and y pan values are presented on leads 410 and 408 respectively and combined into a single lead 172 which is passed to the adder 164 to modify the pixel sequencer's addresses to the output memories.

Adder

The adder 164 accepts input from the output pan register 170 and the pixel sequencer 150. The adder 164 will add the 9-bit unsigned magnitude addresses from the pixel sequencer 150 and the 10-bit two's complement (signed) pan values from the output pan register 170 to produce a pair of 10-bit two's complement addresses which index the desired output pixel. As shown in FIG. 20, the x and y components of the pixel address and pan value are operated on individually with the x pan adder 432 and the y pan adder 438. The x pan adder 432 accepts the 10-bit two's complement x pan value on lead 410 and the 9-bit unsigned magnitude pixel sequencer address on the lead 428 and computes their (signed) sum. The result is a 10-bit two's complement (signed) number which is separated into two signals. The first signal contains the nine least significant bits of the sum and is available on lead 434. The second signal is the most significant bit and is available on lead 436. The signal on lead 434 becomes the x address to the output memories 70, while the signal on lead 436 is used by the memory select and pan overflow blanking logic 154 to blank the display if necessary. The y pan adder 438 operates in a manner similar to the x pan adder 432. The data on leads 434 and 440 are combined into a single lead 168 for addressing the output memories, while the data on leads 436 and 450 are combined into a single lead 169 for use by the output blanking logic.

Method of Using Input Image Panning in Combination With Output Image Panning

A third type of panning results from using input image panning in combination with output image panning. Such third type of panning is equivalent to holding the input image position constant while the transformation is moved about within the input image.

Figure 5:
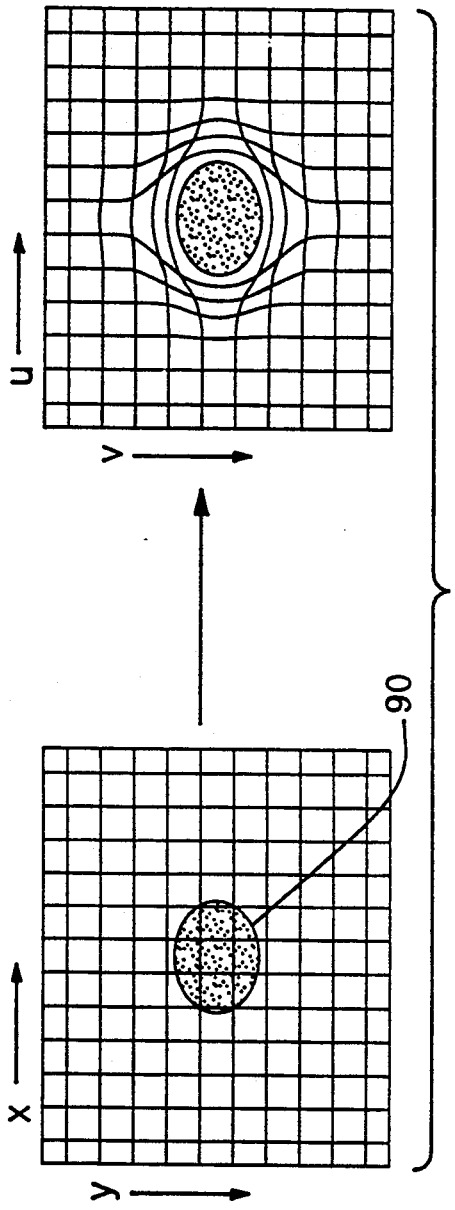
FIG. 5 is an illustration of the results of a transformation from an input image to an output image useful to a person with the eye disease of maculopathy.
Figure 6:
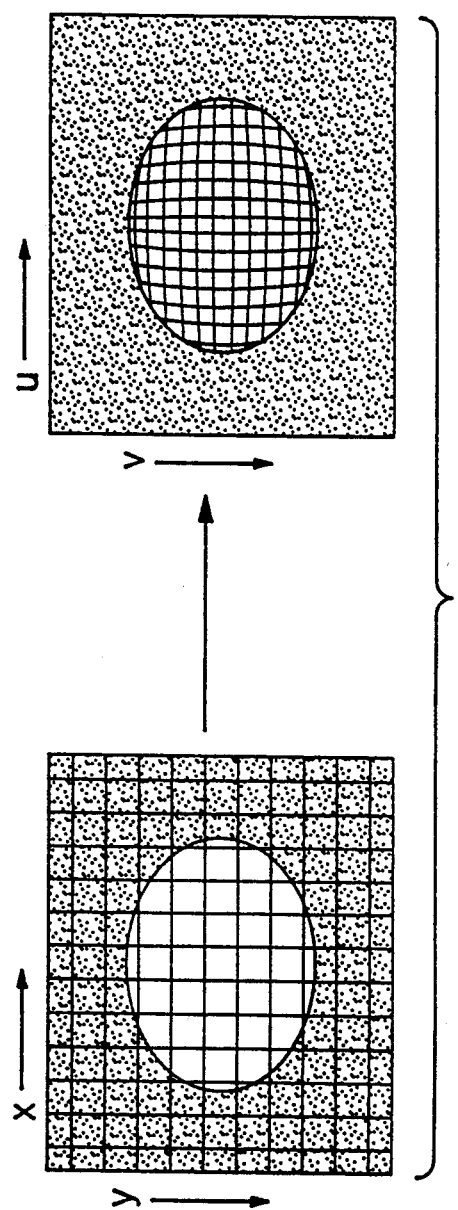
FIG. 6 is an illustration of the results of a transformation from an input image to an output image useful to a person with the eye disease of retinitis pigmentosa.

Referring again to the low vision transformation illustrated in FIG. 5, if the scotoma 90 is in the center of the screen, yet the target on which the center of the scotoma is to be displayed is in the upper right hand corner of the output image, then the third type of panning allows the scotoma 90 and associated warping to be moved to the upper right hand portion of the output screen and the new image information warped such that the target is warped about the translated scotoma. This third type of panning is different from simple input image panning where the target in the upper right of the screen is "pulled" down toward the center of the screen to become warped while the scotoma itself remains stationary in the center of the screen.

The third type of panning or "combination" panning is accomplished as a two step process. First, the input image is panned and the desired target is pulled to the center of the screen to be warped. Next, the output image or display is panned so that the scotoma, or center of the transform, is moved back up to be centered on the output position where the target was initially.

Advantages of input image panning in Pattern Recognition Systems

The input image panning feature described above provides a high speed, high resolution pan-tilt function that is operator controllable. Such feature may be used as a high resolution vernier pan that operates in conjunction with a slower, coarse pan-tilt mechanism, or it can operate as the sole source of pan-tilt.

The need for such high speed, high resolution panning results from the fact that many of the desired transformations for pattern recognition (such as the Weiman-Chaikin ray-ring transform) are very sensitive to translations of the object with respect to the position of the transform with respect to the object. If the transform cannot be centered properly on the objects in the image to be transformed (see for example the ray-ring transform of FIG. 3 with respect to an input image grid), then shift invariance is lost. FIG. 7A shows an input image including rings and rays. When the Weiman-Chaikin transformation is centered over the input image, the rings of the input image are transformed to horizontal bars on the output image of FIG. 7A and the ray patterns are transformed to vertical bars of the output image. FIGS. 7C through 7G illustrate the effect of lack of centering of the transformation of the pattern. Accordingly, input image panning may be used to produce an output image like that of FIG. 7B from an input image like FIG. 7A to insure that the transformation matrix is properly centered such that advantageous features of rotational and scale invariance are maintained for pattern recognition of the output image for comparison with a standard.

Single Flow Architecture

In FIG. 8, the programmable remapper 10 of the present invention is illustrated. The programmable remapper 10 comprises one or more processors 500 operating in parallel to produce an output matrix which appears on a lead 12 to the digital to analog converter 14 (See FIG. 1). When more than one processor 500 is present, e.g., processors 500A, 500B, 500C, in the remapper 10, an output interface 700 merges the results from each of the processors 500A, 500B, 500C to form the complete output matrix on the lead 12.

Figure 9:
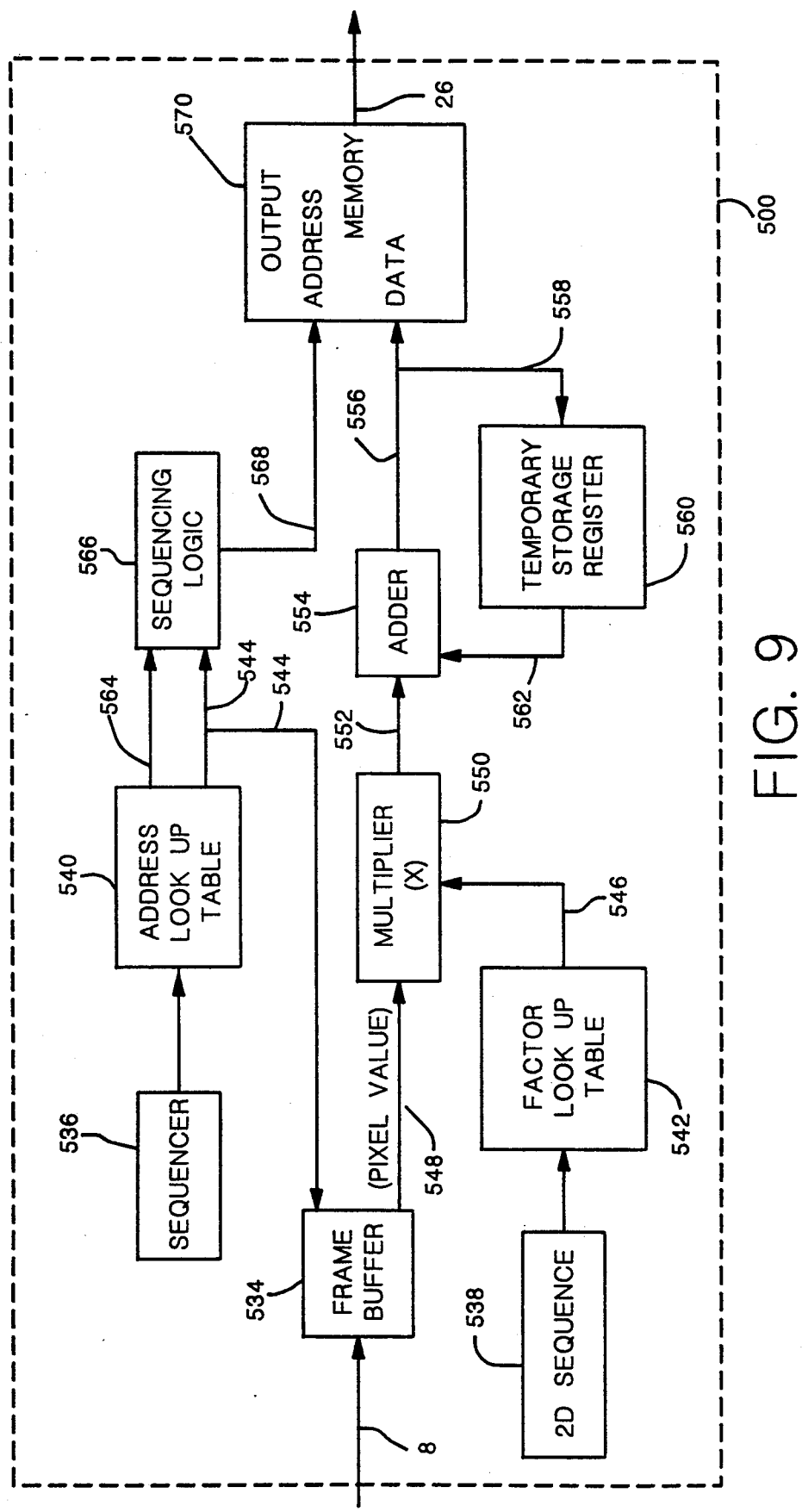
FIG. 9 is a data flow diagram of the preferred embodiment of the processor used in the single flow architecture of the present invention.

FIG. 9 is a data flow diagram of the preferred embodiment of one of the processors 500 as illustrated in FIG. 8. In the preferred embodiment, each processor 500 is identical. However, alternate embodiments using various different processors can be adapted to practice the present invention. When more than one processor 500 is used, each processor will create a usually contiguous portion of the output matrix which is then combined in the output interface 700.

The data flows of the processors 500 are identical and begin with pixel data arriving on a lead 8 from a camera 4. As shown in FIG. 9, the data are stored in a frame buffer 534 for nonsequential access by the processor 500. Once an entire frame has been stored in the frame buffer 534, a first sequencer 536 and a second sequencer 538 are reset to an initial value. The first sequencer 536 and the second sequencer 538 are used to address the Address Look-Up Table (ALUT) 540 and the Factor Look-Up Table (FLUT) 542, respectively. The first and second sequencers 536, 538 read consecutive memory locations and factors out of the memories of the ALUT 540 and FLUT 542, respectively. Each entry of the ALUT 540 has two distinct parts. The first part of an ALUT entry passes through a dual lead 544 and is applied to both the frame buffer 534 and a sequencing logic 566. The second part of the ALUT entry passes through another lead 564 only to the sequencing logic 566. The part of the ALUT entry appearing on the dual lead 544 must be large enough to address the entire frame buffer 534, while that part engaging the other lead 564 will typically be composed of only four bits. The data on the dual lead 544 from the ALUT 540 is used to address one of the pixel values stored in the frame buffer 534. After addressing one of the pixel values stored in the frame buffer 534, the data passes through a lead 548 and is applied to a multiplier 550.

The second sequencer 538 presents the FLUT 542 with an address which is identical to the address supplied by the first sequencer 536 to the ALUT 540. The contents of the FLUT 542 contain data which appears on a lead 546 and is applied to a second input of the multiplier 550. The data received by the multiplier 550 on the leads 548 and 556 are multiplied together by the multiplier 550 to produce a result on another lead 552 and is applied to an adder 554.

The adder 554, a temporary storage register 560, and the associated leads 556, 558, 562 form a feedback loop. The purpose of the feedback loop is to maintain a cumulative total of the results which appear on the lead 552 from the multiplier 550 which will ultimately form the value of the given output pixel. Thus on the first cycle, after a reset the contents of the temporary storage register 560 will be zero, the result on the lead 556 from the adder 554 will be identical to that on the lead 552 from the multiplier 550. This result is then stored via the lead 558 in the temporary storage register 560 to be applied via lead 562 to the adder 554 to be cumulated with the next result from the multiplier 550. This process continues until the required number of input pixels have been processed and accumulated in the feedback loop to form the output pixel value. The output pixel value is supplied on the lead 556 to an output memory 570 at an address which appears on a lead 568 from the sequencing logic 566. This process is repeated until each necessary output pixel represented by memory locations in the output memory 570 has been calculated.

The sequencing logic 566 receives the data from the ALUT 540 on parallel leads 564 and 544. Preferably, a four bit value is transferred through the single termination lead 564. The four bit value is decoded to activate one of sixteen lines internal to the sequencing logic 566 as shown in FIG. 12. Each line, corresponding to a different value on the single termination lead 564 can be utilized by the sequencing logic 566 to control the data on the lead 568 from the sequencing logic 566 to the output memory 570. These bits can be used to signal the processor 500 that this is the last pixel to be processed in this image, or that the data in the ALUT 540 appearing on the dual termination leads 544 is not actually an address for the frame buffer 534, but rather an offset or direct address to modify the data on the lead 568 to the output memory 570. Thus the user can control the data on the lead 568 to the output memory 570 and hence the location of the output memory 570 in which the result of a given operation are to be stored. Generally, the output memory 570 will be addressed sequentially creating the first output pixel first, the second output pixel second, and so forth until the entire output image has been formed. However, it may be advantageous for the user to not create some output pixel which will be known to be blank in the final output. Such is the case with the center of a transform created for use by human patients with the disease known as maculopathy as well as around the outer edges of the transform created for a person with the disease known as retinitis pigmentosa.

Figure 10:
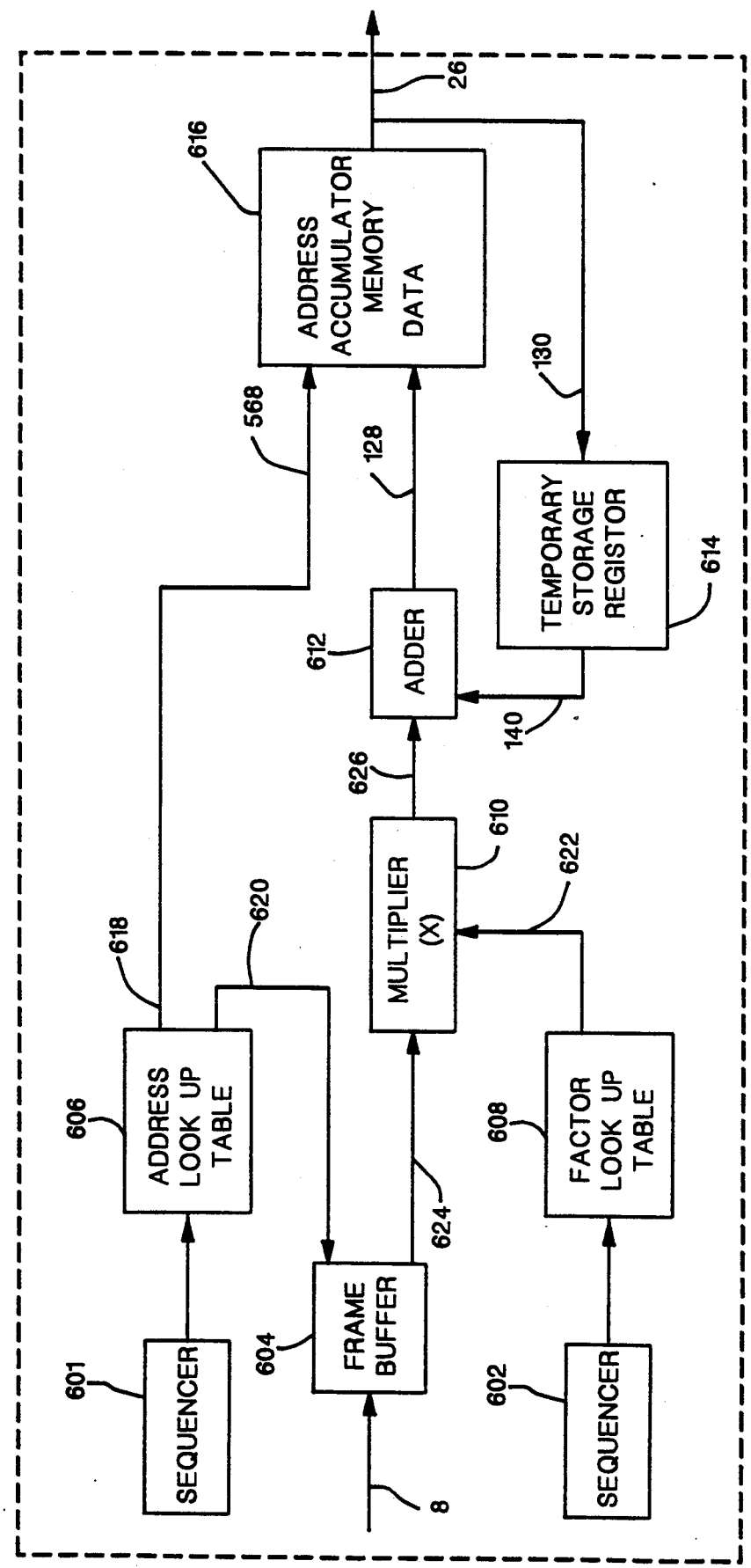
FIG. 10 is a data flow diagram of the alternate embodiment of the processor used in the single flow architecture of the present invention.

The processor 500 illustrated in FIG. 8 can have alternate embodiments. FIG. 10 shows one alternate embodiment of the processor 600. The function of the processor 600 is identical to that illustrated in FIG. 9 depicting the data flow of the processor 500. As in the preferred embodiment illustrated in FIG. 9, all processors 600 function in an identical manner. However, instead of calculating mutually exclusive contiguous portions of the output image, the processor 600 can create all of, or part of, any pixel in the output image. The results of which are merged to an alternate output interface 700A which will be different from the output interface 700 that operates the preferred embodiment processors 500 illustrated in FIG. 9. When one or more processors 600 is present in the programmable remapper 10, the contents of the accumulator memory 616 from each of the parallel processing elements are added together to provide the true output.

The data flow of FIG. 10 begins with the pixel arriving on the lead 8 and being stored in a frame buffer 604. When the input image has been stored in the frame buffer 604, the first and second sequencers 601 and 602, respectively, are reset to their initial values and begin sequencing through the address look-up table (ALUT) 606 and the factor look-up table (FLUT) 608. The sequencers 601 and 602, the frame buffer 604, and the FLUT 608 are analogous to the similarly named components in the data flow diagram of FIG. 9. However, the contents and function of the ALUT 606 are very different than the ALUT 540 of FIG. 9.

The ALUT 606 of FIG. 10 contains two logical entries at each address as shown in FIG. 13B. The first part appears on the lead 618 to the accumulator memory 616 and corresponds to the address in the accumulator memory 616 where the output pixel is to be created. The second part of each ALUT entry is the address of the input pixel to be processed in the frame buffer 604. The processing flow begins by sequentially reading the contents of the ALUT 606, which applies the source pixel address on the lead 620 to the frame buffer 604 which is used to retrieve the input pixel value from the frame buffer 604 which is available on the lead 624 and applied to the multiplier 610. At the same time, the second sequencer 602 has addressed a like location in the FLUT 608 which applies the weighting factor on the line 622 which is applied to the other input of the multiplier 610. The contents of the lead 622 from the FLUT 608 and the pixel value on the lead 624 from the frame buffer 604 multiplied by the multiplier 610 yields a result which is available on the lead 626 and is applied to the adder 612.

In a similar manner as in the block diagram of FIG. 9 illustrating the preferred embodiment, the adder 612, the accumulator memory 616 and the temporary storage register 614 form a feed back loop in which the output pixels get created. The order in which the pixels are created is arbitrary. The intermediate results for a given output pixel are stored in the accumulator memory 616. When the contents of the look-up tables 606 and 608 are exhausted, the contents of the accumulator memory 616 will contain a partial sum of the desired output image. The partial sum of the desired output image is added to the accumulator memories 616 of the other processors 600 to yield the desired output image.

The preferred embodiment of FIG. 9 differs from the alternate embodiment of FIG. 10 in two primary aspects. First, the preferred embodiment of FIG. 9 requires less memory than the alternate embodiment of FIG. 10. The memory difference is in the preferred embodiment of the ALUT 540 of FIG. 9 versus the alternate embodiment of the ALUT 606 of FIG. 10. In the preferred embodiment illustrated in FIG. 9, it is required to store only the address of the desired input pixel in the frame buffer 534 and at least one additional bit to signify that it has completed computing the current output pixel and it is ready to increment the output memory pointer on the lead 568 to the output memory 570 to create the next output pixel. Additional bits may be included to afford additional control of the address pointer of the output memory 570 from the lead 568, but are not necessary to the basic function of the processor 500.

The alternate embodiment ALUT 606 of FIG. 10 requires that the source address of the input pixel be stored in the frame buffer 604 as in the preferred embodiment. However, it is also required that the explicit address of the output pixel be created on the lead 618 to the accumulator memory 616. This is not required in the preferred embodiment because we can assume that we will order out ALUT data such that the output pixels are created in their output raster order, with some possible exceptions afforded by the sequencing logic 566. Thus, the advantage of the alternate embodiment is that the output pixels do not have to be created in any order. However, the user can order the data in the ALUT to create the output pixels in their raster order.

The second advantage of the preferred embodiment illustrated in FIG. 9 is that the alternate embodiment requires a large accumulator memory 616 to be present in the feed back loop used to accumulate the partial sums of output pixels. Such large accumulator memories 616 are inherently slower than the simple temporary storage register 560 of the preferred embodiment illustrated in FIG. 9. This fact is important when considering processing speeds because the processor 500/600 can only process pixels as fast as the slowest loop in the entire system. Thus, using similar parts, the preferred embodiment processor 500 illustrated in FIG. 9 can be made to run much faster than the alternate embodiment illustrated in FIG. 10.

FIG. 11 illustrates the output interface 700 for use with the processors 500. The output interface 700 is utilized to integrate the contents of each of the processing elements output memories 570 for display, as shown in FIG. 11. The interface begins displaying a frame by resetting a pixel sequencer 150 to zero. The pixel sequencer 150 is then incremented to sequentially supply each possible output address on a lead 152. This address on the lead 152 is applied to the output memory 570 on all of the processors 500 (not shown in FIG. 11) that may be installed in the system. FIG. 11 demonstrates three such processors whose output memories are labeled 570A, 570B and 570C. Each output memory 570 supplies its contents at the address given to it by the pixel sequencer 150 on the lead 152 to its output on a respective lead 726A, 726B, and 726C which in turn is applied to the appropriate three-state buffers 758A, 758B, and 758C, respectively. All of the output of the buffers 758 are at their high impedance state except for one at any given time. The memory select logic 754 will enable one of the buffers to permit the data from the appropriate output memory to be impressed on a lead 760 to a digital to analog converter and video interface 762. These data are then available to the digital to analog converter and video interface 762 to be displayed on the output device via a lead 12 in a well known fashion.

FIG. 12A shows a more detailed implementation of the preferred embodiment of the processor 500. The data flow for FIG. 12A is identical to that of FIG. 9 with the exceptions caused by the increased level of detail described below. FIG. 12A adds to FIG. 9 additional information concerning the dimensions of the main memory components, the number of bits required for various signals as well as some additional implementation detail not shown in FIG. 9.

As shown in FIG. 12A, the frame buffer 534 has been split into two buffers 534A and 534B. The data on the lead 8 is directed to one frame buffer or the other via a switch S1. Similarly, the address data on the lead 544 and the image data output on the lead 548 are switched between the frame buffers 534A and 534B via a switch S2. When the switch S1 is in the first position P1, the data on the lead 8 is directed into the frame buffer 534B and switch S2 is in position P4 to allow the frame buffer 534A to accept address data on the lead 544 and present image data on the lead 548. The configuration of the switches S1 and S2 will remain in these positions for the duration of the image frame time. During the next image frame time, the positions of the switches will be reversed, the first switch S1 will be in the second position P2 and the second switch S2 will be in the alternate corresponding position P3. This allows one of the frame buffers 534 to be written with new image data via the lead 8 while the other frame buffer 534 supplies image data via the lead 548.

In a manner similar to that of the frame buffer 534, the output memory 570 is divided into three separate frame buffers 570A, 570B, and 570C. The address data on the lead 568 from the sequencing logic 566 and the image data on the lead 556 are routed to the appropriate output memory 570 via a switch S3 which can select three positions P5, P6 or P7. Similarly, the data output from the output memory 570 is connected to the output lead 26 via a switch S4. Three output memories are required, rather than two, to permit the input and output to run asynchronously. The asynchronous operation of the input and output permits operation at different rates rather than forcing them to operate at the same rate. If the input and output are synchronized, then only two output memories 570 would be required—one to refresh the display device and one to use in building the next image. If the input and output are not synchronized, then it is possible to encounter the condition where one output memory 570 is in the middle of refreshing the display (it is selected by the data out switch S4), another memory has just completed being created (it is selected by the data in switch S3), but a new input frame is available for processing before the output has completed refreshing the display. In this case, rather than abort the display of the current image in the middle or letting the processors sit idle until an output memory 570 becomes available, the data in switch S3 could select the third output memory 570C to create the next output image. The image that just finished being created would be in waiting, not connected to either switch, and the first output memory 570A would still be connected to the display via the data out switch S4 until it is finished displaying its data. When the currently displayed frame has been completed, then the data out switch S4 will select the second frame buffer 534B which has been waiting. Thus, switches S1, S2 and S3 will always switch positions at the same rate that images are input into the processor 500, but the data out switch S4 associated with the output memory 570 can be operated at an independent rate.

FIG. 12A shows an enhanced view of the sequencing logic 566. The sequencing logic 566 is made up of two primary components—the four-to-sixteen line decoder 572 and the address counter 574. The four-to-sixteen line decoder 572 accepts the four bits of sequencing information from the ALUT 540 via a lead 564 therebetween. The decoder 572 then activates a line corresponding to the bit pattern present on the lead 564. One output of this decoder is connected to the address counter 574 to increment the counter's output. Other lines from the decoder 572 may be used for other purposes. One such purpose is, for example, to allow setting the address counter to a specific value. In this case, the appropriate line from the decoder 572 would be connected to the "load" pin of the address counter and the ALUT data on the lead 544 from the frame buffer 534 will be connected to the "load value" pins of the counter 574 and the counter 574 would be loaded with the data from the ALUT 540.

Additionally, FIG. 12A illustrates how frame averaging might be implemented. The feedback loop as illustrated in FIG. 9 (consisting of the adder 554, the temporary storage register 560 and the associated leads 556, 558 and 562) has been modified to include a data selector 576, a frame average register 582, a switch S5 and the associated leads 578, 580 and 584. For frame averaging to be active, the timing of the processor 500 must be altered. When frame averaging is in effect, the output is updated at a slower rate and the processor 500 calculates the output image based on averaging the results of processing two or more input frames. To do this, the processor 500 processes the first frame as normal. However, with frame averaging, the switches S3 and S4 (the switches controlling the output) do not change and the feedback loop switch S5 becomes active. The feedback loop switch S5 connects the recently calculated output image data (the feedback loop switch S5 and the data in switch S3 for the output memory 570 are connected to the same memory) and directs that data back into the feedback loop using the frame average register 582, the leads 584 and 580 into and out of the frame average register 582, and the data selector 576. For each output pixel to be created, the processor 500 reads out the previous image's value and simply adds the previous value into the calculation for the new pixel. The new pixel is created in the feedback loop and stored in the same location in the output memory 570. In normal operation (i.e., when frame averaging is not in effect), the feedback loop switch S5, the frame average register 582, the data selector 576 and the associated leads 580 and 584 have no effect on the operation of the processor 500.

The dimensions (length and bit width) of the memories in the processor 500 are largely a function of the size of images to be accommodated, the number of operations required to calculate a pixel and the accuracy required in the calculations. These memory dimensions in turn determine the number of bits that each lead must carry. In many cases, the dimensions of the memories may be affected by external design parameters. As readily apparent to one skilled in the art, the memory sizes and signal widths shown here are only one possible implementation and many various and sundry implementations are possible.

The frame buffer memories 534A and 534B are both 1,024 rows by 1,024 columns with 8-bits representing each pixel, making each frame buffer 534A and 534B one megabyte long (1,048,576 bytes). The memory dimension of the frame buffer memories 534A and 534B allows the input image matrix to be up to 1,024 pixels by 1,024 pixels in dimension. Accordingly, the address to these one megabyte memories for each frame buffer 534A and 534B must be 20 bits wide to address all 1,048,576 possible pixel locations.

The ALUT 540 contains addresses into the frame buffers 534A and 534B. Thus, the ALUT 540 must contain 20 bits of address information to address all 1,048,576 bytes. In addition to the frame buffer addresses, the ALUT 540 must contain data on the lead 564 which is applied to the sequencing logic 566. The data on the lead 564 to the sequencing logic 566 has at least one bit to signify the completion of the current output pixel's creation. The lead 564 to the sequencing logic 566 may also contain more bits which can be decoded by the sequencing logic 566 to provide more advanced modes of addressing the output memory 570. Four bits on the lead 564 to the sequencing logic 566 will yield an acceptable sixteen possibilities. Thus, the ALUT 540 must be 24 bits wide to hold the 20 address bits that go out on the lead 544 to the counter 574 and the 4 output memory sequencing logic bits that go out on the lead 564 to the sequencing logic 566.

The FLUT 542 contains the factors by which to multiply the pixel data. The factor information can serve two different purposes depending on the particular transformation being employed. If the transformation required that a large input area be transformed to a small output area (the determinant of the Jacobian matrix at this point is less than unity), then the weighting factor in the FLUT 542 will be used to perform a weighted average of the input pixels. If the transformation requires that a small input area map to a larger output area (the determinant of the Jacobian matrix at this point is greater than unity), then the weighting factors are used to form an interpolation kernel. In the former case, the factors for each pixel are inversely proportional to the number of input image pixels to be averaged into the current output pixel. Thus, the width of the weighting factors determines the maximum number of input pixels that can be collected into a single output pixel. For example, if the weighting factor is 8-bits, then we can collect maximum of 255 input pixels into a single output pixel. If the weighing factor is 16 bits, then we can collect a maximum of 65,535 pixels into a single output pixel. Further, if the weighting factor is considered to be a signed number, then the number of input image pixels would be halved to 127 for an 8-bit factor and 32767 for a 16-bit number. In the case where interpolation is required, the weighting factors represent the components of an interpolation kernel and are considered to be signed fixed point numbers. In this case, the width of the FLUT 542 will determine the precision of the factors. In short, the implementation of this memory depends on the amount of accuracy desired in calculating the desired result. Many applications will be satisfactorily served with an 8-bit factor, others may require 16-bits. A third alternative is to provide a look-up table option where the programmer can select between 256 possible 12- or 16-bit numbers. A FLUT width of 8 bits will be used in demonstrating the design requirements of implementing the preferred processor 500.

The length of the ALUT and FLUT memories are identical and are indicative of the total number of input pixels to be processed to form the output image and also of the number of parallel processors 500 that are used in the system. In selecting the length of these tables, the designer must consider the average number of input image pixels which will be used to create an output pixel. This includes the number of input image pixels which will be used in interpolating output pixels (when the Jacobian determinant is greater than unity). The designer may also want to consider whether there is a need to have multiple transformers resident in the memories for rapid selection. The length of these memories may be altered with minimal impact to the implementation.

The output memories are each one quarter of a megabyte (524,288 bytes) long. This memory configuration allows the output image matrix to be 512 rows by 512 columns with each cell being represented by an 8-bit number. This is an acceptable image size for the current state of the art for camera and display technology. Since the output memories are 524,288 bytes long in the present example, the address to these memories, presented on the lead 568 from the counter 574, must be at least 18 bits wide.

The pixel creation feedback loop consisting of the adder 554, the temporary storage register 560 and the associated leads uses 32-bit wide components and leads. The reason is that the output of the multiplier 550 is a 16-bit result (assuming an 8-bit factor and 8-bit data) which is presented on the lead 552 to the adder 554. It is possible to accumulate several such partial products in the loop. The width of the data path has the potential to grow as the log base 2 of the number of iterations. For example, if we add 256 input pixels to create an output pixel, the width of the feedback loop data would grow 8 bits ($8 = \log_2 256$). Since this area has minimal design impact, a data path of 32-bits should take care of all practical cases.

To better illustrate the broad scope of the present invention four different applications of the programmable remapper are presented to highlight the magnitude of the scope of the invention. The four illustrative applications are 1) image resampling using Jacobian analysis, 2) geometric image compression, 3) encryption and decryption of images, and 4) image correlation.

EXAMPLE 1

Image Resampling Using Jacobian Analysis

Image remapping relates a set of input matrix (image) grid points (pixels) to an output matrix of grid points. The input image is usually a Cartesian array of intensity values representing the output of a camera. The output image is a geometrically altered, or warped, version of the input image. Describing the input image coordinates as (x,y) and the output coordinates as (u,v), there is a Jacobian matrix relating the input coordinates (x,y) and the output coordinates (u,v) as show in equation 1.

$$\begin{bmatrix} du \\ dv \end{bmatrix} = \begin{bmatrix} \frac{\partial u}{\partial x} & \frac{\partial u}{\partial y} \\ \frac{\partial v}{\partial x} & \frac{\partial v}{\partial y} \end{bmatrix} \begin{bmatrix} dx \\ dy \end{bmatrix} \quad (1)$$

The Jacobian matrix describes the relationship between the input and the output coordinates. More specifically, the determinant of the Jacobian matrix yields the differential ratio of output area to input area. Thus, when the Jacobian (determinant) is greater than unity at some image location, then we know that a large output area maps to a smaller input area and an interpolation operation is necessary to create the output image data. This information can be used to increase the radiometric accuracy of the interpolation process where a large output area is to be created from a small input area. For example, if the "magnification factor" at some image location is two, then a unit area in the input would map to four unit areas in the output. Consequently, the accuracy required in this interpolation will not greatly effect the apparent accuracy of the output image. For example however, if the magnification factor is 10, then a unit area in the input will map to 100 unit areas in the output. Now the accuracy of the interpolation greatly effects the apparent accuracy of the resulting image and a correspondingly larger interpolation kernel would be chosen. The remapper of the invention has an interpolation kernel which is completely programmable on a pixel-by-pixel basis allowing the radiometric (and hence geometric) accuracy of the output image to vary across the image.

EXAMPLE 2

Geometric Image Compression

Due to the flexible manner in which the remapper of the present invention can manipulate input image pixels, it can be used to perform geometric image compression. In geometric image compression, some image information is lost in order to store (or transmit) the image using less storage (transmission bandwidth). The application for the image data determines what image information is not necessary and can be removed from the image without loss of utility. In the case of image compression for telerobotic applications, it is advantageous to maintain all image information at the point of foveation of the operator, but we do not need all of the information in the periphery of the image because the human visual system's resolution falls off with eccentricity from the fovea. It is then possible to compress the image information in the periphery in a variable fashion prior to transmitting the image from the remote teleoperated platform to the operator. At the operator's station, the image is then decompressed to restore the original Cartesian geometry of the input image. In this method, multiple input image pixels are averaged together to form a single "super-pixel" which is then transmitted to the operator station. There will be fewer super-pixels in the "compressed" image than in the original. At the operator's station, these super-pixels are interpolated to fill the same area that was collapsed into each single super-pixel. The result is an image which is sharp at the location where the operator is looking, and gradually increasing in "fuzziness" as we move away from the point of foveation. Note that this requires that the remapper's transform be electrically panned in order to define the point of foveation. The source of the pan value would be an eye position monitor on the operator or joystick or similar device. The details of this method have been published in a paper entitled "Geometric Transformations for Video Compression and Human Teleoperator Display", Richard D. Juday and Timothy E. Fisher, SPIE proceedings Vol. 1053, H. K. Liu, ed. 1989.

EXAMPLE 3

Encrypting and Decrypting Images

The remapper of the invention has an inherent ability to alter the geometry of pixels in an image. This feature can be used to perform a type of encryption by "scrambling" the relationships of pixels and the corresponding "descrambling" or decryption of the images. In a simple example, the input pixels receive a unique "random" address in the output. The result is an image which does not represent a recognizable image. The random addresses of the output are known and used to take the scrambled image and restore its geometry to the original image. This application uses the remapper of the invention's unique ability to map any input image pixel into any output pixel. This technique is even more powerful when combined with the geometric image compression scheme mentioned above as well as other well known signal encryption/decryption schemes.

EXAMPLE 4

Image Correlation

Image correlation is the comparison of a reference image with an input image and yields a third image called a correlation image (or sometimes a correlation surface). This process is well known to those skilled in the art and involves multiplying the reference image by the input image and summing the result similar to a convolution. In true correlation, this operation is performed in every possible shifted configuration of the two images, however it is customary to shift the two images by more than a single pixel step to save on computation. In the remapper of the invention this is accomplished by setting the preimage of each output pixel to be centered at a similar location in the input image and have a surrounding area equal to the size of the reference image to be correlated. Thus at each output location, the input image is multiplied by the reference image and the sum is taken. The resulting pixel is then the value of the correlation of the input image and reference image at that location. The next pixels are calculated in an identical manner.

It is possible to alter the shift distance between correlation measurements by skipping certain output pixels. It is also possible to alter the shift distance on an image location dependent basis. For example, we may desire to have a very small shift distance (and hence accuracy in the correlation surface) near the center of the field of view where we expect to find the reference image. The step distance can then be increased (yielding a less accurate correlation surface) as we digress from the center. More accurately, the shift distance can be made proportional to the inverse of the probability that the desired pattern (reference) is located at this image position. This process can be used in an iterative method where a potential correlation in an area with less correlation accuracy is shifted to an area which has a high correlation accuracy to verify the existence of the pattern using the remapper of the invention's input pan capability. In a tracking mode where we wish to follow the already identified target pattern as it moves about the field of view, we would change the values of the input pan to force the target pattern to stay in the center of the screen where we have the highest accuracy in the correlation surface.

In addition to altering the shift distances between successive correlation measurements, it is also possible to alter the reference image on a correlation measurement by correlation measurement basis. This can be very useful when the shift distance are non-uniform. For example, where the shift distances are greater (and correlation accuracy is lesser) we may desire to make the reference image less sensitive to translating offsets so that if the reference image lays over the input image near the actual location of the target pattern, an acceptable correlation will result. Due to the ability of the remapper of the invention to use many processing elements in parallel, the size of the reference image and accuracy of the correlation surface (step size of correlation measurements) may be increased as required by adding more processing elements.

Various modifications and alterations in the described structures will be apparent to those skilled in the art of the foregoing description which does not depart from the spirit of the invention. For this reason, these changes are desired to be included in the claims. The claims which follow recite the only limitations to the present invention and the descriptive manner which is employed for setting forth the embodiments and is to be interpreted as illustrative and not limitative.

What is claimed is:

1. The method of generating image transformations of an input image to an output image in an accumulator/display memory by use of precalculated factor look up tables and address look up tables where the address lookup tables are of the type which have both an output destination address in an accumulator/display memory and a source input address in a frame buffer, where the input image is composed of input image pixels and the output image is composed of output image pixels, each output pixel being formed from a pre-image of input pixels, each pixel having a pixel value, and where the image transformations are of the type such that the sequential order in which the output image pixels are created and stored is different from the sequential order in which the input image pixels are stored, comprising the steps:
   (a) storing the input image pixel values in the frame buffer;
   (b) specifying explicitly in the address lookup tables the input pixels comprising a pre-image where the input pixels forming the pre-image may be non-contiguous and where each input pixel may be used in more than one pre-image;
   (c) reading the source address from the address look up table for a pre-image pixel;
   (d) reading the source pixel value from the image buffer for the pre-image pixel;
   (e) reading the factor corresponding to the pre-image pixel from the factor look up table;
   (f) multiplying the factor and the pixel value to form a product;
   (g) reading the destination address from the address look up table;
   (h) reading the contents of the accumulator/display memory at the destination address;
   (i) adding the product from step (f) to the contents read in step (h);
   (j) writing the sum of step (i) to the accumulator/display memory at the destination address;
   (k) repeating steps (c) through (j) for each remaining specified pixel in the pre-image; and
   (l) repeating steps (c) through (k) for each output pixel.

2. The method of claim 1 where the addresses of input pixels forming the pre-image are functions of the desired transformation characteristics and may be non-contiguous.

3. The method of claim 1 where the pre-images may be of variable size and may overlap.

4. The method of performing image transformations of an input image to an output image in an output memory by use of precalculated factor look up tables and address look up tables where the address lookup tables are of the type which addresses only pixels in a frame buffer, where the input image is composed of input image pixels and the output image is composed of output image pixels, each output pixel being formed from a pre-image of input pixels, each pixel having a pixel value, and where the image transformations are of the type such that the sequential order in which the output image pixels are created and stored is different from the sequential order in which the input image pixels are stored, comprising the steps:
   (a) storing the input image pixel values in the frame buffer;
   (b) creating the output pixels in a prescribed order, as follows:
      (1) specifying explicitly in the address look up table the number and addresses of input pixels for the pre-image where the number and addresses of input pixels are functions of the transform being performed, input pixels may be non-contiguous, and each input pixel may be used in more than one pre-image;
      (2) reading the source address from the address look up table for a pre-image pixel;
      (3) reading the source pixel value from the image buffer for the pre-image pixel;
      (4) reading the factor corresponding to the pre-image pixel from the factor look up table;
      (5) multiplying the factor and the pixel value;
      (6) accumulating the product from step (5) with any previous values for that pre-image in an accumulator register;
      (7) repeating steps (2) through (6) until pre-image is complete;
      (8) writing the contents of the accumulator register to an output memory;
   (c) repeating steps (1) through (8) until image transformation is complete.

5. The method of claim 4 where the order, step (b), in which the output pixels are created is the sequential order of their output locations, and comprising the further step;
   (9) incrementing the output memory address; and where step (c) is the step of repeating steps (1) through (9).

6. The method of claim 4 where any input pixel may be used in the pre-image of more than one output pixel.

7. A processing system for receiving a set of input pixels and transforming them into a corresponding set of output pixels, each input pixel having a pixel value, comprising;
   (a) means for receiving a set of input pixels;

(b) processor means for performing a first transformation of a first subset of said set of input pixels into a first subset of output pixels, and a second transformation of a second subset of said set of input pixels into a second subset of output pixels and in which the second subset of input pixels may be different from the first subset and the second transformation may be different from the first transformation, wherein, the processor means further comprises;
  (1) frame buffer means for storing, in a first sequential order, input pixels;
  (2) output memory means for storing output pixels;
  (3) addressing means for addressing pixel values stored in the frame buffer; the number of pixels addressed, the explicit accumulation to form an output pixel which is sent to the output memory means, the adder means and the temporary storage means thus forming a feedback loop;
  (10) sequencing logic means for providing the address in the output memory to which the output pixel is sent and for causing the output pixel accumulated in the feedback loop to be written to the output memory means.

8. The processing system of claim 7, wherein, the sequencing logic means increments the output memory address.

9. The processing system of claim 7, wherein, the sequencing logic means includes a counter means and a decoder means for loading counter means to address any desired output memory location.

10. The processing system of claim 7, wherein, the frame buffer means and the output memory means are adapted to perform the reading of input pixels on a frame by frame basis and writing of output pixels on a frame by frame basis, and where the reading of input frames and writing of output frames are performed asynchronously.

11. The method of processing a set of input pixels into a set of output pixels, where each output pixel is created from a subset of input pixels, comprising the steps;
  (a) forming one or more subsets of input pixels; wherein the input pixels may be of variable number up to the total number of input pixels, the input pixels may be noncontiguous, and wherein each subset may contain any input pixel and each subset of input pixels may be formed independently of any other subset, and
  (b) transforming each subset of input pixels into an output pixel.

12. The method of claim 11 where the input and output pixels may be represented as functions of input and output coordinates and where the relationship between the input coordinates and the output coordinates may be represented by a Jacobian matrix, further comprising the steps;
  (c) performing an interpolative transformation when the determinant of the Jacobian is greater than unity; and
  (d) performing a collective transformation when the determinant of the Jacobian is less than unity.

13. The method of claim 11 wherein the single processor means operates in accordance with the equation;

$$O(u, v) = \sum\sum_{\{i, j\}} I(x_i, y_j) * w(i, j; u, v)$$

where;
  $O(u,v)$ is the output pixel being created;
  $\{i,j\}$ are indices defining the subset of input pixels and are functions of u,v;
  $I(x_i,y_j)$ are the addresses of source pixels in the subset of input pixels; and
  $w(i,j;u,v)$ are weighting factors.

14. The method of claim 11 wherein the process of transforming the first subset of input pixels and the second subset of input pixels comprises the following steps;
  (a) storing, in a first sequential order, the set of input pixels;
  (b) storing in factor lookup tables, precalculated weighting factors for each input pixel;
  (c) addressing, in a second sequential order, by means of address lookup tables, the stored pixels comprising the subset of input pixels;
  (d) reading each of the addressed pixel values;
  (e) reading the corresponding weighting factor for each addressed pixel;
  (f) multiplying each addressed pixel value and its corresponding weighting factor to produce a product;
  (g) repeating steps (d) through (f) and accumulating the products for all the pixels in the subset for an output pixel;
  (h) storing the accumulated product as the output pixel; and
  (i) repeating steps (c) through (h) until set of output pixels is complete.

15. The method of claim 14 where the addresses of input pixels forming the subset are functions of the desired transformation and the subset of input pixels may be non-contiguous.

16. The method of claim 14, wherein, the reading of input pixels and storing of output pixels are performed asynchronously.

17. The method of claim 14 where the first sequential order is the same as the second sequential order.

18. The method of claim 14 where the first sequential order is not the same as the second sequential order.

19. The method of processing a set of input pixels into a set of output pixels, where each output pixel is formed from a subset of input pixels, said subset of input pixels being of variable number up to the total number of input pixels, comprising the steps;
  (a) specifying explicitly the address of each input pixel in the subset of input pixels, where the input pixels of any subset may be non-contiguous, and where any input pixel may be used in more than one subset of input pixels, and
  (b) transforming each subset of input pixels into an output pixel.

* * * * *